United States Patent
Cha et al.

(10) Patent No.: US 11,943,739 B2
(45) Date of Patent: Mar. 26, 2024

(54) POSITIONING METHOD IN WIRELESS COMMUNICATION SYSTEM, AND DEVICE FOR SUPPORTING SAME

(71) Applicant: LG Electronics Inc., Seoul (KR)

(72) Inventors: Hyunsu Cha, Seoul (KR); Sukhyon Yoon, Seoul (KR)

(73) Assignee: LG Electronics Inc., Seoul (KR)

( * ) Notice: Subject to any disclaimer, the term of this patent is extended or adjusted under 35 U.S.C. 154(b) by 218 days.

(21) Appl. No.: 17/431,005

(22) PCT Filed: Feb. 14, 2020

(86) PCT No.: PCT/KR2020/002150
§ 371 (c)(1),
(2) Date: Aug. 13, 2021

(87) PCT Pub. No.: WO2020/167055
PCT Pub. Date: Aug. 20, 2020

(65) Prior Publication Data
US 2022/0150865 A1    May 12, 2022

Related U.S. Application Data

(60) Provisional application No. 62/806,725, filed on Feb. 15, 2019.

(51) Int. Cl.
| | | |
|---|---|---|
| *H04W 64/00* | (2009.01) | |
| *G01S 5/02* | (2010.01) | |
| *H04L 5/00* | (2006.01) | |
| *H04W 24/10* | (2009.01) | |

(52) U.S. Cl.
CPC ......... *H04W 64/006* (2013.01); *G01S 5/0268* (2013.01); *H04L 5/0051* (2013.01); *H04W 24/10* (2013.01)

(58) Field of Classification Search
CPC ... H04W 64/00; H04W 64/006; H04W 24/10; G01S 5/0036; G01S 5/011; G01S 5/0236; G01S 5/0244; G01S 5/0252; G01S 5/0258; G01S 5/0266; G01S 5/02955; G01S 5/06; G01S 5/08; G01S 5/10; H04L 5/0048; H04L 5/0051; H04L 5/0057
See application file for complete search history.

(56) References Cited

U.S. PATENT DOCUMENTS

| | | |
|---|---|---|
| 2014/0349582 A1 | 11/2014 | Xiao et al. |
| 2017/0289953 A1 | 10/2017 | Chae |
| 2018/0048444 A1 | 2/2018 | Park et al. |
| 2019/0353748 A1* | 11/2019 | Rydén ....................... G01S 5/14 |

(Continued)

FOREIGN PATENT DOCUMENTS

| | | |
|---|---|---|
| JP | 5841198 | 1/2016 |
| JP | 2018509614 | 4/2018 |

(Continued)

OTHER PUBLICATIONS

PCT/KR2018/002328 (Year: 2018).*
Extended European Search Report in European Appln. No. 20756535.9, dated Feb. 9, 2022, 13 pages.

*Primary Examiner* — Siu M Lee
(74) *Attorney, Agent, or Firm* — Fish & Richardson P.C.

(57) ABSTRACT

Disclosed are a positioning method in a wireless communication system, and a device for supporting same.

7 Claims, 28 Drawing Sheets

(56) References Cited

U.S. PATENT DOCUMENTS

| | | | |
|---|---|---|---|
| 2019/0380056 A1* | 12/2019 | Lee | H04B 7/0695 |
| 2020/0229124 A1* | 7/2020 | Soriaga | H04W 4/023 |
| 2020/0267682 A1* | 8/2020 | Manolakos | H04W 64/00 |
| 2020/0267684 A1* | 8/2020 | Huang | H04L 5/0051 |
| 2020/0408871 A1* | 12/2020 | Da | H04L 5/0053 |
| 2022/0116089 A1* | 4/2022 | Khoryaev | H04B 7/0695 |

FOREIGN PATENT DOCUMENTS

| | | |
|---|---|---|
| KR | 20130052674 | 5/2013 |
| KR | 20170042174 | 4/2017 |
| KR | 20170107975 | 9/2017 |
| WO | WO2018069208 | 4/2018 |

* cited by examiner

FIG. 3
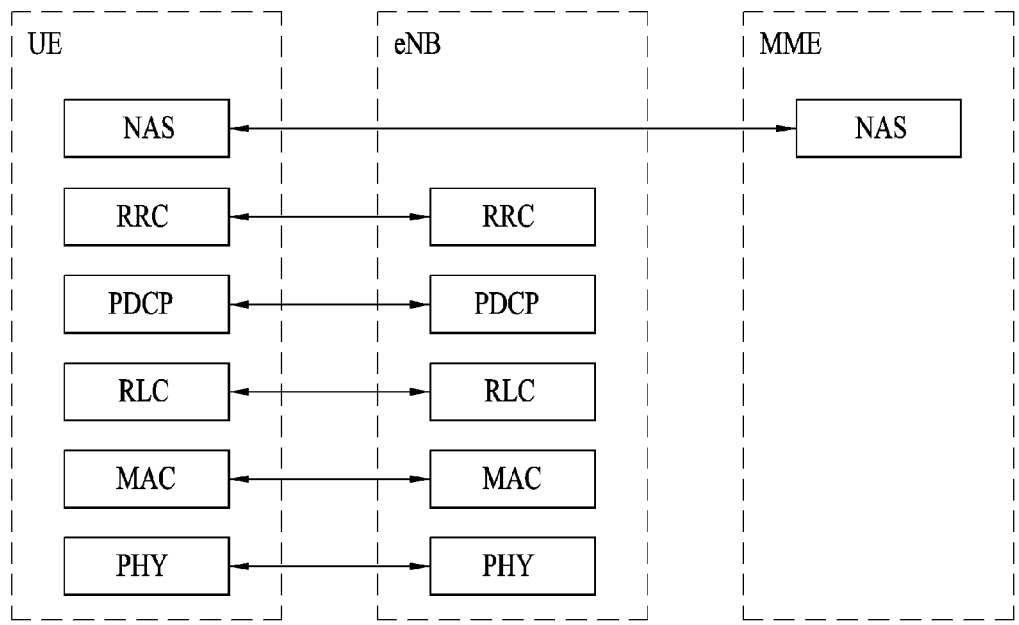
(A) CONTROL-PLANE PROTOCOL STACK
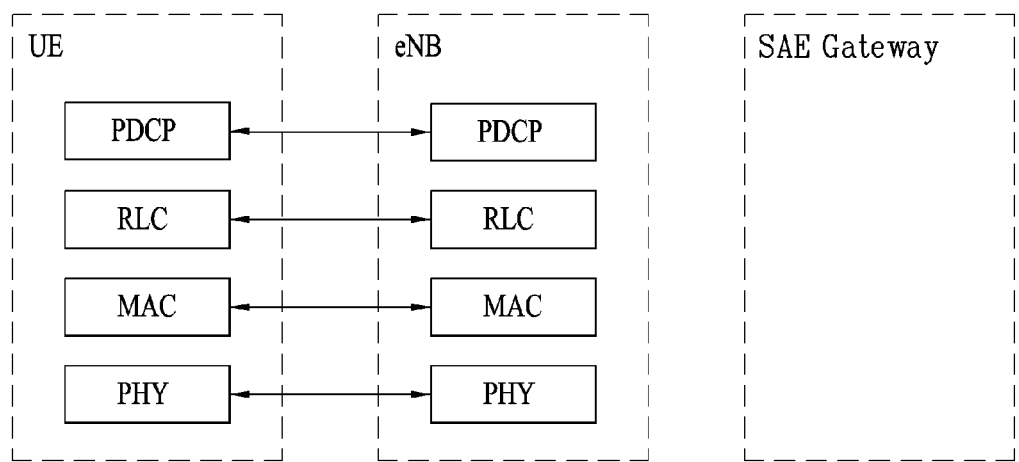
(B) USER-PLANE PROTOCOL STACK

FIG. 6
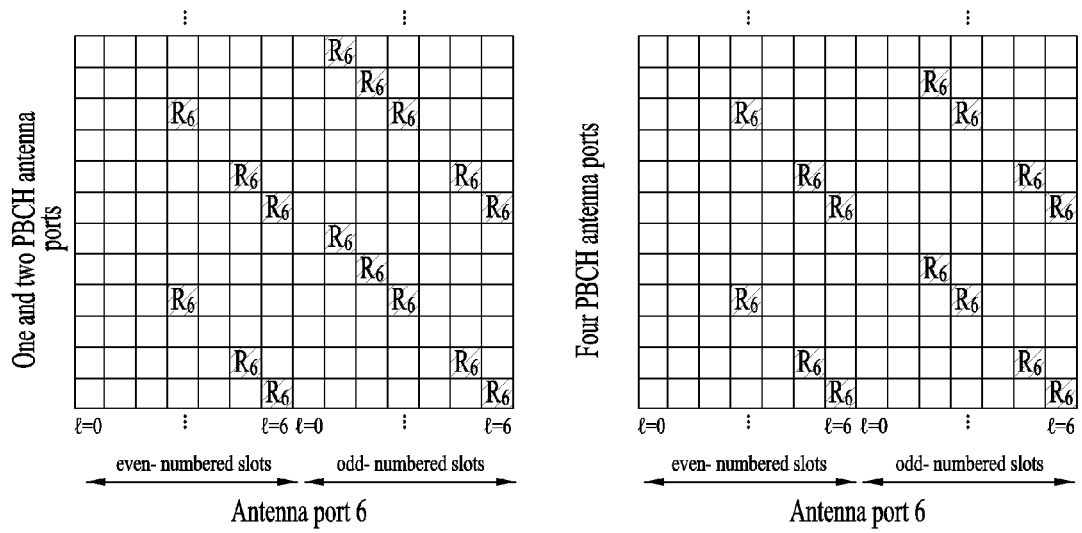
(a)
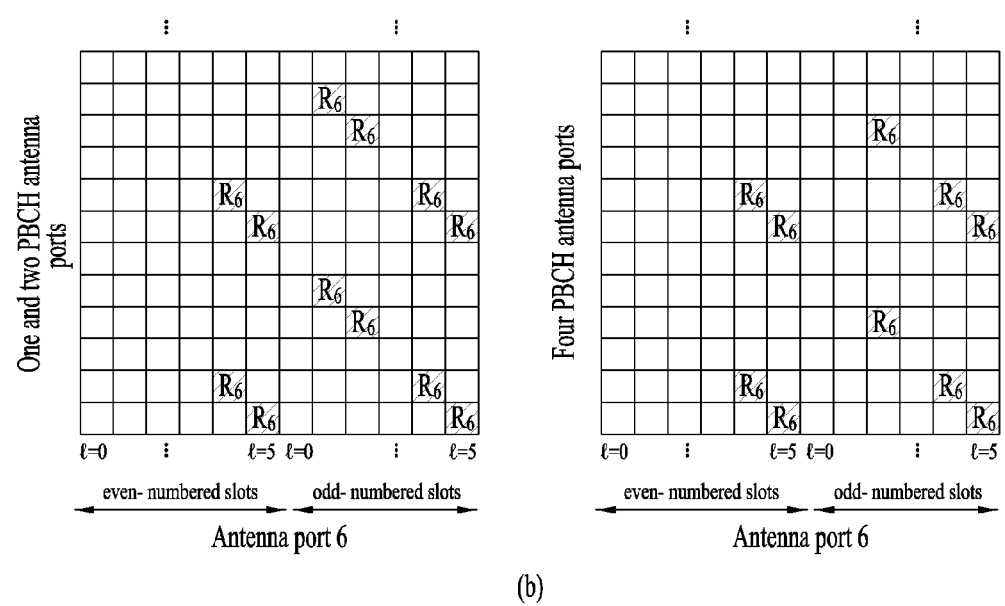
(b)

POSITIONING METHOD IN WIRELESS COMMUNICATION SYSTEM, AND DEVICE FOR SUPPORTING SAME

CROSS-REFERENCE TO RELATED APPLICATIONS

This application is a National Stage application under 35 U.S.C. § 371 of International Application No. PCT/KR2020/002150, filed on Feb. 14, 2020, which claims the benefit of U.S. Provisional Application No. 62/806,725, filed on Feb. 15, 2019. The disclosures of the prior applications are incorporated by reference in their entirety.

TECHNICAL FIELD

The present disclosure relates to a positioning method in a wireless communication system and apparatus for supporting the same.

BACKGROUND

Wireless access systems have been widely deployed to provide various types of communication services such as voice or data. In general, a wireless access system is a multiple access system that supports communication of multiple users by sharing available system resources (a bandwidth, transmission power, etc.) among them. For example, multiple access systems include a code division multiple access (CDMA) system, a frequency division multiple access (FDMA) system, a time division multiple access (TDMA) system, an orthogonal frequency division multiple access (OFDMA) system, and a single carrier frequency division multiple access (SC-FDMA) system.

As a number of communication devices have required higher communication capacity, the necessity of the mobile broadband communication much improved than the existing radio access technology (RAT) has increased. In addition, massive machine type communications (MTC) capable of providing various services at anytime and anywhere by connecting a number of devices or things to each other has been considered in the next generation communication system. Moreover, a communication system design capable of supporting services/UEs sensitive to reliability and latency has been discussed.

As described above, the introduction of the next generation RAT considering the enhanced mobile broadband communication, massive MTC, ultra-reliable and low latency communication (URLLC), and the like has been discussed.

SUMMARY

The present disclosure may provide a method and apparatus for transmitting and receiving a signal in a wireless communication system.

Specifically, the present disclosure may provide a positioning method in a wireless communication system and apparatus for supporting the same.

It will be appreciated by persons skilled in the art that the objects that could be achieved with the present disclosure are not limited to what has been particularly described hereinabove and the above and other objects that the present disclosure could achieve will be more clearly understood from the following detailed description.

The present disclosure may provide a method for a user equipment (UE) in a wireless communication system.

For example, the method may include: receiving a plurality of positioning reference signals (PRSs) related to a plurality of PRS resources; and transmitting a measurement report on the plurality of PRS resources.

For example, the measurement report may include: information on one or more reference signal time differences (RSTDs) measured based on one or more first PRS resources among the plurality of PRS resources; and information on one or more first PRS resource indices related to the one or more first PRS resources.

For example, the one or more RSTDs may be related to an observed time difference of arrival (OTDOA), and the one or more first PRS indices may be related to an angle of departure (AOD).

For example, the method may further include receiving configuration information on the measurement report.

For example, the information on the one or more RSTDs and the information on the one or more first PRS resource indices may be included in the measurement report in response to the configuration information.

For example, the one or more first PRS resource indices may include a PRS resource index related to an RSTD measured based on a minimum time of arrival (TOA) among the one or more RSTDs.

For example, the measurement report may include: information on one or more reference signal received powers (RSRPs) measured based on one or more second PRS resources among the plurality of PRSs; and information on one or more second PRS resource indices related to the one or more second PRS resources.

For example, the one or more second PRS resource indices in the measurement report may include a PRS resource index related to a maximum RSRP among the one or more RSRPs.

For example, based on that quality of the one or more RSTDs is more than a predetermined threshold, the information on the one or more RSTDs and the information on the one or more first PRS resource indices may be included in the measurement report.

For example, based on that the quality of the one or more RSTDs is less than or equal to the predetermined threshold, (i) the information on the one or more RSTDs and the information on the one or more first PRS resource indices may not be included in the measurement report, and (ii) the information on the one or more RSRPs and the information on the one or more second PRS resource indices may be included in the measurement report.

The present disclosure may provide an apparatus configured to operate in a wireless communication system.

For example, the apparatus may include a memory; and one or more processors connected to the memory.

For example, the one or more processors may be configured to: receive a plurality of PRSs related to a plurality of PRS resources; and transmit a measurement report on the plurality of PRS resources.

For example, the measurement report may include: information on one or more RSTDs measured based on one or more first PRS resources among the plurality of PRS resources; and information on one or more first PRS resource indices related to the one or more first PRS resources.

For example, the apparatus may be configured to communicate with at least one of a mobile terminal, a network, or an autonomous driving vehicle other than a vehicle including the apparatus.

The present disclosure may provide a method for an apparatus in a wireless communication system For example, the method may include: transmitting information on a plurality of PRS resources; receiving a measurement report on the plurality of PRS resources; and obtaining information on a location of a UE related to the measurement report, based on the measurement report.

For example, the measurement report may include: information on one or more RSTDs measured based on one or more first PRS resources among the plurality of PRS resources; and information on one or more first PRS resource indices related to the one or more first PRS resources.

For example, obtaining the information on the location of the UE may include: obtaining information on a first estimated location of the UE based on an OTDOA related to the one or more RSTDs; obtaining information on a second estimated location of the UE based on an AOD related to the one or more first PRS resource indices; and obtaining the information on the location of the UE based on the information on the first estimated location and the information on the second estimated location.

The present disclosure may provide an apparatus configured to operate in a wireless communication system.

For example, the apparatus may include: a memory; and one or more processors connected to the memory.

For example, the one or more processors may be configured to: transmit information on a plurality of PRS resources; receive a measurement report on the plurality of PRS resources; and obtain information on a location of a UE related to the measurement report, based on the measurement report.

For example, the measurement report may include: information on one or more RSTDs measured based on one or more first PRS resources among the plurality of PRS resources; and information on one or more first PRS resource indices related to the one or more first PRS resources.

For example, the one or more processors are configured to: obtain information on a first estimated location of the UE based on an OTDOA related to the one or more RSTDs; obtain information on a second estimated location of the UE based on an AOD related to the one or more first PRS resource indices; and obtain the information on the location of the UE based on the information on the first estimated location and the information on the second estimated location.

The present disclosure may provide an apparatus configured to operate in a wireless communication system.

For example, the apparatus may include: one or more processors; and one or more memories configured to store one or more instructions that cause the one or more processors to perform a method.

For example, the method may include: receiving a plurality of PRSs related to a plurality of PRS resources; and transmitting a measurement report on the plurality of PRS resources.

For example, the measurement report may include: information on one or more RSTDs measured based on one or more first PRS resources among the plurality of PRS resources; and information on one or more first PRS resource indices related to the one or more first PRS resources.

The present disclosure may provide a processor-readable medium configured to store one or more instructions that cause one or more processors to perform a method.

For example, the method may include: receiving a plurality of PRSs related to a plurality of PRS resources; and transmitting a measurement report on the plurality of PRS resources.

For example, the measurement report may include: information on one or more RSTDs measured based on one or more first PRS resources among the plurality of PRS resources; and information on one or more first PRS resource indices related to the one or more first PRS resources.

Various embodiments of the present disclosure as described above are only some of preferred embodiments of the present disclosure, and those skilled in the art may derive and understand many embodiments in which technical features of the various embodiments of the present disclosure are reflected based on the following detailed description.

According to the present disclosure, a positioning method for improving positioning accuracy in a wireless communication system by using a plurality of positioning methods in combination and apparatus for supporting the same are provided.

It will be appreciated by persons skilled in the art that the effects that can be achieved with the present disclosure are not limited to what has been particularly described hereinabove and other advantages of the present disclosure will be more clearly understood from the following detailed description.

BRIEF DESCRIPTION OF THE DRAWINGS

FIG. 3 is a view illustrating the control-plane and user-plane architecture of radio interface protocols between a user equipment (UE) and an evolved UMTS terrestrial radio access network (E-UTRAN) in conformance to a 3rd generation partnership project (3GPP) radio access network standard.

FIG. 6 illustrates an exemplary pattern to which a positioning reference signal (PRS) is mapped in an LTE system.

DETAILED DESCRIPTION

Figure 1:
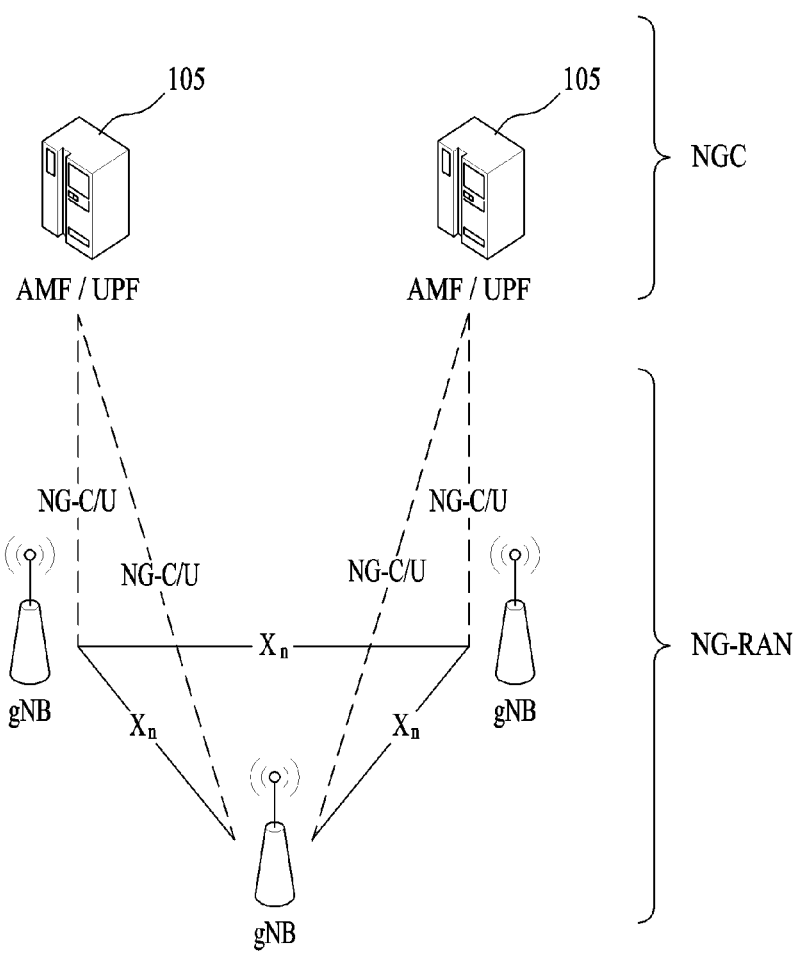
FIG. 1 is a view illustrating an example of a network architecture of a new radio access technology (new RAT or NR) system.

The configuration, operation, and other features of the present disclosure will readily be understood with embodiments of the present disclosure described with reference to the attached drawings. Embodiments of the present disclosure as set forth herein are examples in which the technical features of the present disclosure are applied to a 3rd generation partnership project (3GPP) system.

While embodiments of the present disclosure are described in the context of long term evolution (LTE) and LTE-advanced (LTE-A) systems, they are purely exemplary. Therefore, the embodiments of the present disclosure are applicable to any other communication system as long as the above definitions are valid for the communication system.

The term, base station (BS) may be used to cover the meanings of terms including remote radio head (RRH), evolved Node B (eNB or eNode B), transmission point (TP), reception point (RP), relay, and so on.

The 3GPP communication standards define downlink (DL) physical channels corresponding to resource elements (REs) carrying information originated from a higher layer, and DL physical signals which are used in the physical layer and correspond to REs which do not carry information originated from a higher layer. For example, physical downlink shared channel (PDSCH), physical broadcast channel (PBCH), physical multicast channel (PMCH), physical control format indicator channel (PCFICH), physical downlink control channel (PDCCH), and physical hybrid ARQ indicator channel (PHICH) are defined as DL physical channels, and reference signals (RSs) and synchronization signals (SSs) are defined as DL physical signals. An RS, also called a pilot signal, is a signal with a predefined special waveform known to both a gNode B (gNB) and a user equipment (UE). For example, cell specific RS, UE-specific RS (UE-RS), positioning RS (PRS), and channel state information RS (CSI-RS) are defined as DL RSs. The 3GPP LTE/LTE-A standards define uplink (UL) physical channels corresponding to REs carrying information originated from a higher layer, and UL physical signals which are used in the physical layer and correspond to REs which do not carry information originated from a higher layer. For example, physical uplink shared channel (PUSCH), physical uplink control channel (PUCCH), and physical random access channel (PRACH) are defined as UL physical channels, and a demodulation reference signal (DMRS) for a UL control/data signal, and a sounding reference signal (SRS) used for UL channel measurement are defined as UL physical signals.

In the present disclosure, the PDCCH/PCFICH/PHICH/PDSCH refers to a set of time-frequency resources or a set of REs, which carry downlink control information (DCI)/a control format indicator (CFI)/a DL acknowledgement/negative acknowledgement (ACK/NACK)/DL data. Further, the PUCCH/PUSCH/PRACH refers to a set of time-frequency resources or a set of REs, which carry UL control information (UCI)/UL data/a random access signal. In the present disclosure, particularly a time-frequency resource or an RE which is allocated to or belongs to the PDCCH/PCFICH/PHICH/PDSCH/PUCCH/PUSCH/PRACH is referred to as a PDCCH RE/PCFICH RE/PHICH RE/PDSCH RE/PUCCH RE/PUSCH RE/PRACH RE or a PDCCH resource/PCFICH resource/PHICH resource/PDSCH resource/PUCCH resource/PUSCH resource/PRACH resource. Hereinbelow, if it is said that a UE transmits a PUCCH/PUSCH/PRACH, this means that UCI/UL data/a random access signal is transmitted on or through the PUCCH/PUSCH/PRACH. Further, if it is said that a gNB transmits a PDCCH/PCFICH/PHICH/PDSCH, this means that DCI/control information is transmitted on or through the PDCCH/PCFICH/PHICH/PDSCH.

Hereinbelow, an orthogonal frequency division multiplexing (OFDM) symbol/carrier/subcarrier/RE to which a CRS/DMRS/CSI-RS/SRS/UE-RS is allocated to or for which the CRS/DMRS/CSI-RS/SRS/UE-RS is configured is referred to as a CRS/DMRS/CSI-RS/SRS/UE-RS symbol/carrier/subcarrier/RE. For example, an OFDM symbol to which a tracking RS (TRS) is allocated or for which the TRS is configured is referred to as a TRS symbol, a subcarrier to which a TRS is allocated or for which the TRS is configured is referred to as a TRS subcarrier, and an RE to which a TRS is allocated or for which the TRS is configured is referred to as a TRS RE. Further, a subframe configured to transmit a TRS is referred to as a TRS subframe. Further, a subframe carrying a broadcast signal is referred to as a broadcast subframe or a PBCH subframe, and a subframe carrying a synchronization signal (SS) (e.g., a primary synchronization signal (PSS) and/or a secondary synchronization signal (SSS)) is referred to as an SS subframe or a PSS/SSS subframe. An OFDM symbol/subcarrier/RE to which a PSS/SSS is allocated or for which the PSS/SSS is configured is referred to as a PSS/SSS symbol/subcarrier/RE.

In the present disclosure, a CRS port, a UE-RS port, a CSI-RS port, and a TRS port refer to an antenna port configured to transmit a CRS, an antenna port configured to transmit a UE-RS, an antenna port configured to transmit a CSI-RS, and an antenna port configured to transmit a TRS, respectively. Antenna port configured to transmit CRSs may be distinguished from each other by the positions of REs occupied by the CRSs according to CRS ports, antenna ports configured to transmit UE-RSs may be distinguished from each other by the positions of REs occupied by the UE-RSs according to UE-RS ports, and antenna ports configured to transmit CSI-RSs may be distinguished from each other by the positions of REs occupied by the CSI-RSs according to CSI-RS ports. Therefore, the term CRS/UE-RS/CSI-RS/TRS port is also used to refer to a pattern of REs occupied by a CRS/UE-RS/CSI-RS/TRS in a predetermined resource area.

FIG. 1 is a view illustrating an example of a network architecture of an NR system.

The structure of the NR system broadly includes a next-generation radio access network (NG-RAN) and a next-generation core (NGC) network. The NGC is also referred to as a 5GC.

Referring to FIG. 1, the NG-RAN includes gNBs that provide a UE with user plane protocol (e.g., SDAP, PDCP, RLC, MAC, and PHY) and control plane protocol (e.g., RRC, PDCP, RLC, MAC, and PHY) terminations. The gNBs are interconnected through an Xn interface. The gNBs are connected to the NGC through an NG interface. For example, the gNBs are connected to a core network node having an access and mobility management function (AMF) through an N2 interface, which is one of interfaces between the gNBs and the NGC and to a core network node having a user plane function (UPF) through an N3 interface, which is another interface between the gNB and the NGC. The AMF and the UPF may be implemented by different core network devices or may be implemented by one core network device. In the RAN, signal transmission/reception between a BS and a UE is performed through a radio interface. For example, signal transmission/reception between the BS and the UE in the RAN is performed through a physical resource (e.g., a radio frequency (RF)). In contrast, signal transmission/reception between the gNB and the network functions (e.g., AMF and UPF) in the core network may be performed through physical connection (e.g., optical cable) between the core network nodes or through logical connection between the core network functions, rather than through the radio interface.

The various descriptions, functions, procedures, proposals, methods, and/or operational flowcharts of the present disclosure described in this document may be applied to, but not limited to, various fields that require wireless communication/connections (e.g., 5G communication/connections) between devices.

Hereinafter, description will be given in detail with reference to the accompanying drawings. In the following drawings/description, the same reference numerals may denote the same or corresponding hardware blocks, software blocks, or functional blocks unless specified otherwise.

Figure 2:
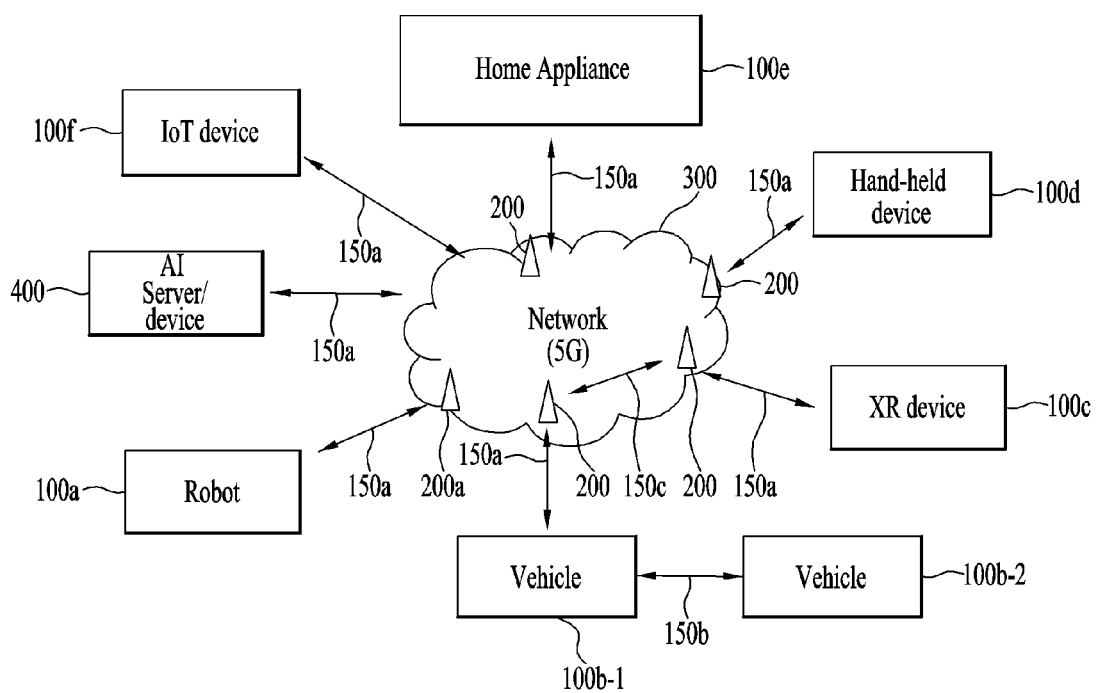
FIG. 2 illustrates an exemplary wireless communication environment to which embodiments of the present disclosure are applicable

FIG. 2 illustrates a communication system 1 applicable to the present disclosure.

Referring to FIG. 2, the communication system 1 applicable to the present disclosure includes wireless devices, BSs, and a network. Herein, the wireless device represents a device performing communication based on a radio access technology (e.g., 5G NR, LTE, etc.) and may be referred to as a communication/radio/5G device. The wireless devices may include, but not limited to, a robot 100a, vehicles 100b-1 and 100b-2, an extended reality (XR) device 100c, a hand-held device 100d, a home appliance 100e, an Internet of things (IoT) device 100f, and an artificial intelligence (AI) device/server 400. For example, the vehicles may include a vehicle having a wireless communication function, an autonomous driving vehicle, and a vehicle capable of performing communication between vehicles. Herein, the vehicles may include an unmanned aerial vehicle (UAV) (e.g., a drone). The XR device may include an augmented reality/virtual reality/mixed reality (AR/VR/MR) device and be implemented in the form of a head-mounted device (HMD), a head-up display (HUD) mounted in vehicles, a television (TV), a smartphone, a computer, a wearable device, a home appliance device, a digital signage, a vehicle, a robot, etc. The hand-held device may include a smartphone, a smartpad, a wearable device (e.g., a smartwatch or smartglasses), and a computer (e.g., a notebook). The home appliance may include a TV, a refrigerator, and a washing machine. The IoT device may include a sensor and a smart meter. For example, the network and BSs may be implemented as wireless devices, and a specific wireless device 200a may operate as a BS/network node for other wireless devices.

The wireless devices 100a to 100f may be connected to the network 300 via the BSs 200. An AI technology may be applied to the wireless devices 100a to 100f, and the wireless devices 100a to 100f may be connected to the AI server 400 via the network 300. The network 300 may include a 3G network, a 4G (e.g., LTE) network, or a 5G (e.g., NR) network. Although the wireless devices 100a to 100f may communicate with each other through the BSs/network 200/300, the wireless devices 100a to 100f may perform direct communication (e.g., sidelink communication) with each other without assistance from the BSs/network 200/300. For example, the vehicles 100b-1 and 100b-2 may perform direct communication (e.g. vehicle-to-vehicle/vehicle-to-everything (V2V/V2X) communication). The IoT device (e.g., a sensor) may perform direct communication with other IoT devices (e.g., sensors) or other wireless devices 100a to 100f.

Wireless communication/connections 150a, 150b, or 150c may be established between the wireless devices 100a to 100f and BSs 200 or between one BS 200 and another BS 200. Herein, the wireless communication/connections may be established through various radio access technologies (e.g., 5G NR) such as UL/DL communication 150a, sidelink communication 150b (or device-to-device (D2D) communication), or inter-BS communication (e.g. relay, integrated access backhaul (IAB), etc.). The wireless devices and BSs may transmit/receive radio signals to/from each other through the wireless communication/connections 150a to 150c. For example, signals may be transmitted/received over various physical channels for the wireless communication/connections 150a to 150c. To this end, at least a part of various configuration information configuring processes, signal processing processes (e.g., channel encoding/decoding, modulation/demodulation, resource mapping/demapping, etc.), and resource allocating processes for radio signal transmission/reception may be performed based on various proposals of the present disclosure.

FIG. 3 illustrates control-plane and user-plane protocol stacks in a radio interface protocol architecture conforming to a 3GPP wireless access network standard between a UE and an evolved UMTS terrestrial radio access network (E-UTRAN). The control plane is a path in which the UE and the E-UTRAN transmit control messages to manage calls, and the user plane is a path in which data generated from an application layer, for example, voice data or Internet packet data is transmitted.

A physical (PHY) layer at layer 1 (L1) provides information transfer service to its higher layer, a medium access control (MAC) layer. The PHY layer is connected to the MAC layer via transport channels. The transport channels deliver data between the MAC layer and the PHY layer. Data is transmitted on physical channels between the PHY layers of a transmitter and a receiver. The physical channels use time and frequency as radio resources. Specifically, the physical channels are modulated in orthogonal frequency division multiple access (OFDMA) for downlink (DL) and in single carrier frequency division multiple access (SC-FDMA) for uplink (UL).

The MAC layer at layer 2 (L2) provides service to its higher layer, a radio link control (RLC) layer via logical channels. The RLC layer at L2 supports reliable data transmission. RLC functionality may be implemented in a function block of the MAC layer. A packet data convergence protocol (PDCP) layer at L2 performs header compression to reduce the amount of unnecessary control information and thus efficiently transmit Internet protocol (IP) packets such as IP version 4 (IPv4) or IP version 6 (IPv6) packets via an air interface having a narrow bandwidth.

A radio resource control (RRC) layer at the lowest part of layer 3 (or L3) is defined only on the control plane. The RRC layer controls logical channels, transport channels, and physical channels in relation to configuration, reconfiguration, and release of radio bearers. A radio bearer refers to a service provided at L2, for data transmission between the UE and the E-UTRAN. For this purpose, the RRC layers of the UE and the E-UTRAN exchange RRC messages with each other. If an RRC connection is established between the UE and the E-UTRAN, the UE is in RRC Connected mode and otherwise, the UE is in RRC Idle mode. A Non-Access Stratum (NAS) layer above the RRC layer performs functions including session management and mobility management.

DL transport channels used to deliver data from the E-UTRAN to UEs include a broadcast channel (BCH) carrying system information, a paging channel (PCH) carrying a paging message, and a shared channel (SCH) carrying user traffic or a control message. DL multicast traffic or control messages or DL broadcast traffic or control messages may be transmitted on a DL SCH or a separately defined DL multicast channel (MCH). UL transport channels used to deliver data from a UE to the E-UTRAN include a random access channel (RACH) carrying an initial control message and a UL SCH carrying user traffic or a control message. Logical channels that are defined above transport channels and mapped to the transport channels include a broadcast control channel (BCCH), a paging control channel (PCCH), a Common Control Channel (CCCH), a multicast control channel (MCCH), a multicast traffic channel (MTCH), etc.

Figure 4:
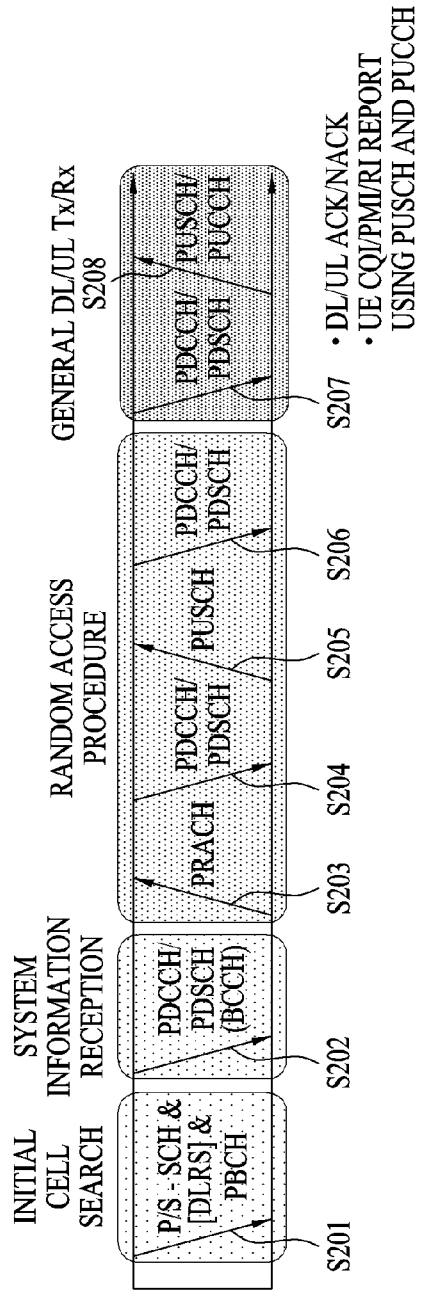
FIG. 4 is a view illustrating physical channels and a general signal transmission method using the physical channels in a 3GPP system.

FIG. 4 illustrates physical channels and a general method for transmitting signals on the physical channels in the 3GPP system.

When a UE is powered on or enters a new cell, the UE performs initial cell search (S401). The initial cell search involves acquisition of synchronization to an eNB. Specifically, the UE synchronizes its timing to the eNB and acquires a cell identifier (ID) and other information by receiving a primary synchronization channel (P-SCH) and a secondary synchronization channel (S-SCH) from the eNB. Then the UE may acquire information broadcast in the cell by receiving a physical broadcast channel (PBCH) from the eNB. During the initial cell search, the UE may monitor a DL channel state by receiving a downlink reference signal (DL RS).

After the initial cell search, the UE may acquire detailed system information by receiving a physical downlink control channel (PDCCH) and receiving a physical downlink shared channel (PDSCH) based on information included in the PDCCH (S402).

If the UE initially accesses the eNB or has no radio resources for signal transmission to the eNB, the UE may perform a random access procedure with the eNB (S403 to S406). In the random access procedure, the UE may transmit a predetermined sequence as a preamble on a physical random access channel (PRACH) (S403 and S405) and may receive a response message to the preamble on a PDCCH and a PDSCH associated with the PDCCH (S404 and S406). In the case of a contention-based RACH, the UE may additionally perform a contention resolution procedure.

After the above procedure, the UE may receive a PDCCH and/or a PDSCH from the eNB (S607) and transmit a physical uplink shared channel (PUSCH) and/or a physical uplink control channel (PUCCH) to the eNB (S208), which is a general DL and UL signal transmission procedure. Particularly, the UE receives downlink control information (DCI) on a PDCCH. Herein, the DCI includes control information such as resource allocation information for the UE. Different DCI formats are defined according to different usages of DCI.

Control information that the UE transmits to the eNB on the UL or receives from the eNB on the DL includes a DL/UL acknowledgment/negative acknowledgment (ACK/NACK) signal, a channel quality indicator (CQI), a precoding matrix index (PMI), a rank indicator (RI), etc. In the 3GPP LTE system, the UE may transmit control information such as a CQI, a PMI, an RI, etc. on a PUSCH and/or a PUCCH.

In the NR system, a method of using an ultra-high frequency band, that is, a millimeter frequency band at or above 6 GHz has been considered to transmit data to a plurality of users at a high transmission rate in a wide frequency band. In 3GPP, such a technology is called "NR". In the present disclosure, it is referred to as the NR system.

The NR system employs an OFDM transmission scheme or a similar transmission scheme. Specifically, the NR system may follow OFDM parameters different from those of LTE. The NR system may follow the legacy LTE/LTE-A numerology but have a larger system bandwidth (e.g., 100 MHz). Further, one cell may support a plurality of numerologies. That is, UEs operating with different numerologies may coexist within one cell.

Discontinuous Reception (DRX) Operation

While the UE performs the above-described/proposed procedures and/or methods, the UE may perform the DRX operation. The UE for which DRX is configured may reduce power consumption by discontinuously receiving a DL signal. DRX may be performed in a radio resource control (RRC)_IDLE state, an RRC_INACTIVE state, or an RRC_CONNECTED state. DRX in the RRC_IDLE state and the RRC_INACTIVE state is used to discontinuously receive a paging signal. Hereinafter, DRX performed in the RRC_CONNECTED state will be described (RRC_CONNECTED DRX).

Figure 5:
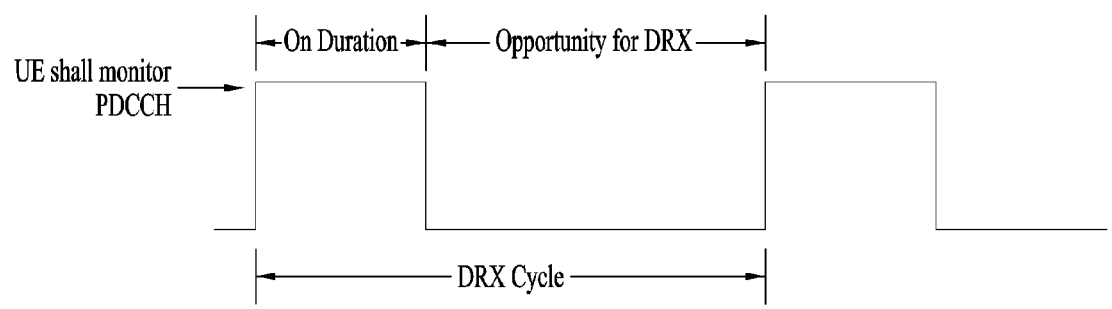
FIG. 5 is a view for explaining an embodiment of a discontinuous reception (DRX) operation.

FIG. 5 illustrates a DRX cycle (RRC_CONNECTED state).

Referring to FIG. 5, the DRX cycle includes an On-duration and an opportunity for DRX. The DRX cycle defines a time interval at which the On-duration is cyclically repeated. The On-Duration indicates a time duration that the UE monitors to receive a PDCCH. If DRX is configured, the UE performs PDCCH monitoring during the On-duration. If the PDCCH is successfully detected during PDCCH monitoring, the UE operates an inactivity timer and maintains an awoken state. On the other hand, if there is no PDCCH which has been successfully detected during PDCCH monitoring, the UE enters a sleep state after the On-duration is ended. Therefore, when DRX is configured, the UE may discontinuously perform PDCCH monitoring/reception in the time domain upon performing the above-described/proposed procedures and/or methods. For example, when DRX is configured, a PDCCH reception occasion (e.g., a slot having a PDCCH search space) in the present disclosure may be discontinuously configured according to DRX configuration. when DRX is not configured, PDCCH monitoring/reception may be continuously performed in the time domain. For example, when DRX is not configured, the PDCCH reception occasion (e.g., the slot having the PDCCH search space) in the present disclosure may be continuously configured. Meanwhile, PDCCH monitoring may be restricted in a time duration configured as a measurement gap regardless of whether DRX is configured or not.

Table 1 illustrates a UE procedure related to DRX (RRC_CONNECTED state). Referring to Table 1, DRX configuration information is received through higher layer (e.g., RRC) signaling. Whether DRX is ON or OFF is controlled by a DRX command of a MAC layer. If DRX is configured, the UE may discontinuously perform PDCCH monitoring upon performing the above-described/proposed procedures and/or methods in the present disclosure, as illustrated in FIG. 5.

TABLE 1

| | Type of signals | UE procedure |
|---|---|---|
| 1st step | RRC signalling (MAC-CellGroupConfig) | Receive DRX configuration information |
| 2nd Step | MAC CE ((Long) DRX command MAC CE) | Receive DRX command |
| 3rd Step | — | Monitor a PDCCH during an on-duration of a DRX cycle |

Herein, MAC-CellGroupConfig includes configuration information needed to configure a MAC parameter for a cell group. MAC-CellGroupConfig may also include configuration information regarding DRX. For example, MAC-CellGroupConfig may include information for defining DRX as follows. —Value of drx-OnDurationTimer: defines the length of a starting duration of a DRX cycle.

Value of drx-InactivityTimer: defines the length of a starting duration in which the UE is in an awoken state, after a PDCCH occasion in which a PDCCH indicating initial UL or DL data is detected.

Value of drx-HARQ-RTT-TimerDL: defines the length of a maximum time duration until DL retransmission is received, after DL initial transmission is received.

Value of drx-HARQ-RTT-TimerDL: defines the maximum duration until a grant for UL retransmission is received after reception of a grant for initial UL transmission.

drx-LongCycleStartOffset: defines a time length and a starting time point of a DRX cycle drx-ShortCycle (optional): defines a time length of a short DRX cycle.

Herein, if any one of drx-OnDurationTimer, drx-InactivityTimer, drx-HARQ-RTT-TimerDL, and drx-HARQ-RTT-TimerDL is operating, the UE performs PDCCH monitoring in every PDCCH occasion while maintaining an awoken state.

Positioning Reference Signal (PRS) in LTE System

Positioning may refer to determining the geographical position and/or velocity of the UE based on measurement of radio signals. Location information may be requested by and reported to a client (e.g., an application) associated with to the UE. The location information may also be requested by a client within or connected to a core network. The location information may be reported in standard formats such as formats for cell-based or geographical coordinates, together with estimated errors of the position and velocity of the UE and/or a positioning method used for positioning.

For such positioning, a positioning reference signal (PRS) may be used. The PRS is a reference signal used to estimate the position of the UE. For example, in the LTE system, the PRS may be transmitted only in a DL subframe configured for PRS transmission (hereinafter, "positioning subframe"). If both a multimedia broadcast single frequency network (MBSFN) subframe and a non-MBSFN subframe are configured as positioning subframes, OFDM symbols of the MBSFN subframe should have the same cyclic prefix (CP) as subframe #0. If only MBSFN subframes are configured as the positioning subframes within a cell, OFDM symbols configured for the PRS in the MBSFN subframes may have an extended CP.

The sequence of the PRS may be defined by Equation 1 below.

$$r_{l,n_s}(m) = \frac{1}{\sqrt{2}}(1 - 2 \cdot c(2m)) + j\frac{1}{\sqrt{2}}(1 - 2 \cdot c(2m+1)),$$ [Equation 1]

$$m = 0, 1, \ldots, 2N_{RB}^{max,DL} - 1$$

where $n_s$ denotes a slot number in a radio frame and 1 denotes an OFDM symbol number in a slot. $N_{RB}^{max,DL}$ is represented as an integer multiple of $N_{SC}^{RB}$ as the largest value among DL bandwidth configurations. $N_{SC}^{RB}$ denotes the size of a resource block (RB) in the frequency domain, for example, 12 subcarriers.

c(i) denotes a pseudo-random sequence and may be initialized by Equation 2 below.

$$c_{init}=2^{28} \cdot \lfloor N_{ID}^{PRS}/512 \rfloor + 2^{10} \cdot (7 \cdot (n_s+1)+l+1) \cdot (N_{ID}^{PRS} \bmod 512)+1)+2 \cdot (N_{ID}^{PRS} \bmod 512)+N_{CP}$$ [Equation 2]

Unless additionally configured by higher layers, $N_{ID}^{PRS}$ is equal to $N_{ID}^{cell}$, and $N_{CP}$ is 1 for a normal CP and 0 for an extended CP.

Figure 8:
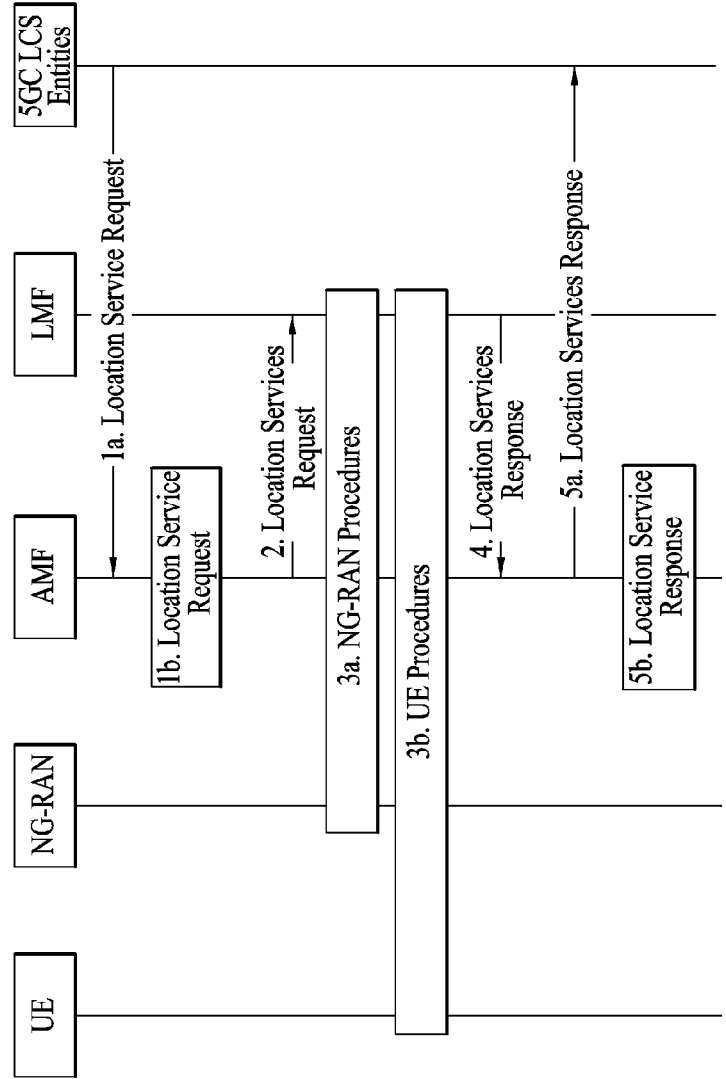

FIG. 8 illustrates an exemplary pattern to which a PRS is mapped in a subframe. As illustrated in FIG. 8, the PRS may be transmitted through an antenna port 6. FIG. 8(a) illustrates mapping of the PRS in the normal CP and FIG. 8(b) illustrates mapping of the PRS in the extended CP.

The PRS may be transmitted in consecutive subframes grouped for position estimation. The subframes grouped for position estimation are referred to as a positioning occasion. The positioning occasion may consist of 1, 2, 4 or 6 subframe. The positioning occasion may occur periodically with a periodicity of 160, 320, 640 or 1280 subframes. A cell-specific subframe offset value may be defined to indicate the starting subframe of PRS transmission. The offset value and the periodicity of the positioning occasion for PRS transmission may be derived from a PRS configuration index as listed in Table 2 below.

TABLE 2

| PRS configuration Index (IPRS) | PRS periodicity (subframes) | PRS subframe offset (subframes) |
|---|---|---|
| 0-159 | 160 | $I_{PRS}$ |
| 160-479 | 320 | $I_{PRS}$-160 |
| 480-1119 | 640 | $I_{PRS}$-480 |
| 1120-2399 | 1280 | $I_{PRS}$-1120 |
| 2400-2404 | 5 | $I_{PRS}$-2400 |
| 2405-2414 | 10 | $I_{PRS}$-2405 |
| 2415-2434 | 20 | $I_{PRS}$-2415 |
| 2435-2474 | 40 | $I_{PRS}$-2435 |
| 2475-2554 | 80 | $I_{PRS}$-2475 |
| 2555-4095 | Reserved | |

A PRS included in each positioning occasion is transmitted with constant power. A PRS in a certain positioning occasion may be transmitted with zero power, which is referred to as PRS muting. For example, when a PRS transmitted by a serving cell is muted, the UE may easily detect a PRS of a neighbor cell.

The PRS muting configuration of a cell may be defined by a periodic muting sequence consisting of 2, 4, 8 or 16 positioning occasions. That is, the periodic muting sequence may include 2, 4, 8, or 16 bits according to a positioning occasion corresponding to the PRS muting configuration and each bit may have a value "0" or "1". For example, PRS muting may be performed in a positioning occasion with a bit value of "0".

The positioning subframe is designed as a low-interference subframe so that no data is transmitted in the positioning subframe. Therefore, the PRS is not subjected to interference due to data transmission although the PRS may interfere with PRSs of other cells.

UE Positioning Architecture in NR system

Figure 7:
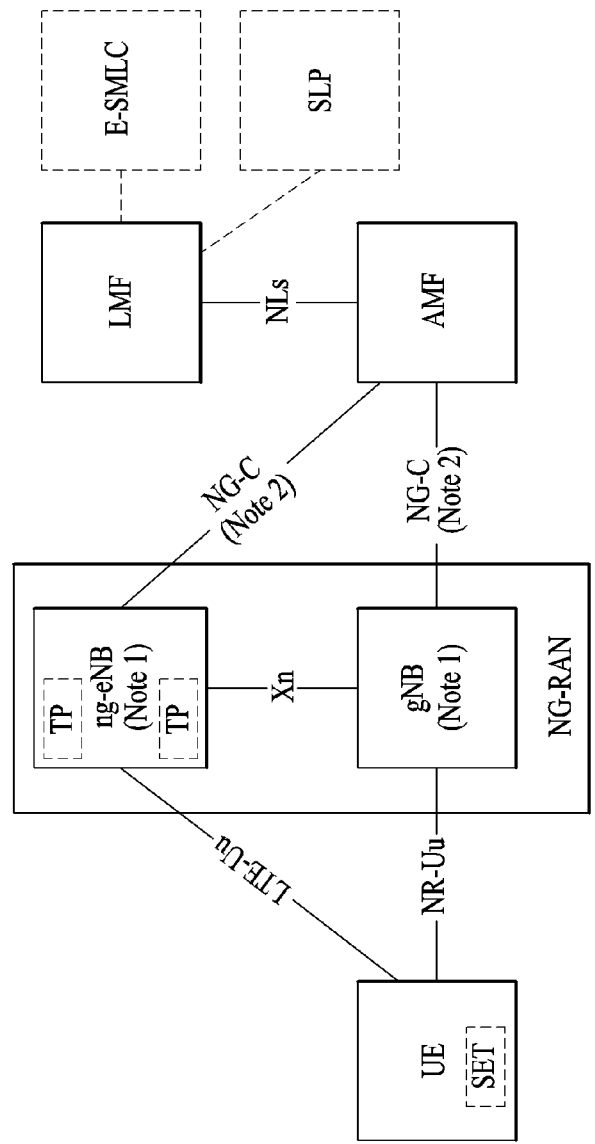
FIGS. 7 and 8 are views illustrating the architecture of a system for measuring the position of a UE and a procedure of measuring the position of the UE.

FIG. 7 illustrates architecture of a 5G system applicable to positioning of a UE connected to an NG-RAN or an E-UTRAN.

Referring to FIG. 7, an AMF may receive a request for a location service associated with a particular target UE from another entity such as a gateway mobile location center (GMLC) or the AMF itself decides to initiate the location service on behalf of the particular target UE. Then, the AMF transmits a request for a location service to a location management function (LMF). Upon receiving the request for the location service, the LMF may process the request for the location service and then returns the processing result including the estimated position of the UE to the AMF. In the case of a location service requested by an entity such as the GMLC other than the AMF, the AMF may transmit the processing result received from the LMF to this entity.

A new generation evolved-NB (ng-eNB) and a gNB are network elements of the NG-RAN capable of providing a measurement result for positioning. The ng-eNB and the gNB may measure radio signals for a target UE and transmits a measurement result value to the LMF. The ng-eNB may control several transmission points (TPs), such as remote radio heads, or PRS-only TPs for support of a PRS-based beacon system for E-UTRA.

The LMF is connected to an enhanced serving mobile location center (E-SMLC) which may enable the LMF to access the E-UTRAN. For example, the E-SMLC may enable the LMF to support observed time difference of arrival (OTDOA), which is one of positioning methods of the E-UTRAN, using DL measurement obtained by a target UE through signals transmitted by eNBs and/or PRS-only TPs in the E-UTRAN.

The LMF may be connected to an SUPL location platform (SLP). The LMF may support and manage different location services for target UEs. The LMF may interact with a serving ng-eNB or a serving gNB for a target UE in order to obtain position measurement for the UE. For positioning of the target UE, the LMF may determine positioning methods, based on a location service (LCS) client type, required quality of service (QoS), UE positioning capabilities, gNB positioning capabilities, and ng-eNB positioning capabilities, and then apply these positioning methods to the serving gNB and/or serving ng-eNB. The LMF may determine additional information such as accuracy of the location estimate and velocity of the target UE. The SLP is a secure user plane location (SUPL) entity responsible for positioning over a user plane.

The UE may measure the position thereof using DL RSs transmitted by the NG-RAN and the E-UTRAN. The DL RSs transmitted by the NG-RAN and the E-UTRAN to the UE may include a SS/PBCH block, a CSI-RS, and/or a PRS. Which DL RS is used to measure the position of the UE may conform to configuration of LMF/E-SMLC/ng-eNB/E-UTRAN etc. The position of the UE may be measured by an RAT-independent scheme using different global navigation satellite systems (GNSSs), terrestrial beacon systems (TBSs), WLAN access points, Bluetooth beacons, and sensors (e.g., barometric sensors) installed in the UE. The UE may also contain LCS applications or access an LCS application through communication with a network accessed thereby or through another application contained therein. The LCS application may include measurement and calculation functions needed to determine the position of the UE. For example, the UE may contain an independent positioning function such as a global positioning system (GPS) and report the position thereof, independent of NG-RAN transmission. Such independently obtained positioning information may be used as assistance information of positioning information obtained from the network.

Operation for UE Positioning

FIG. 8 illustrates an implementation example of a network for UE positioning. When an AMF receives a request for a location service in the case in which the UE is in connection management (CM)-IDLE state, the AMF may make a request for a network triggered service in order to establish a signaling connection with the UE and to assign a specific serving gNB or ng-eNB. This operation procedure is omitted in FIG. 8. In other words, in FIG. 8, it may be assumed that the UE is in a connected mode. However, the signaling connection may be released by an NG-RAN as a result of signaling and data inactivity while a positioning procedure is still ongoing.

An operation procedure of the network for UE positioning will now be described in detail with reference to FIG. 8. In step 1a, a 5GC entity such as GMLC may transmit a request for a location service for measuring the position of a target UE to a serving AMF. Here, even when the GMLC does not make the request for the location service, the serving AMF may determine the need for the location service for measuring the position of the target UE according to step 1b. For example, the serving AMF may determine that itself will perform the location service in order to measure the position of the UE for an emergency call.

In step 2, the AMF transfers the request for the location service to an LMF. In step 3a, the LMF may initiate location procedures with a serving ng-eNB or a serving gNB to obtain location measurement data or location measurement assistance data. For example, the LMF may transmit a request for location related information associated with one or more UEs to the NG-RAN and indicate the type of necessary location information and associated QoS. Then, the NG-RAN may transfer the location related information to the LMF in response to the request. In this case, when a location determination method according to the request is an enhanced cell ID (E-CID) scheme, the NG-RAN may transfer additional location related information to the LMF in one or more NR positioning protocol A (NRPPa) messages. Here, the "location related information" may mean all values used for location calculation such as actual location estimate information and radio measurement or location measurement. Protocol used in step 3a may be an NRPPa protocol which will be described later.

Additionally, in step 3b, the LMF may initiate a location procedure for DL positioning together with the UE. For example, the LMF may transmit the location assistance data to the UE or obtain a location estimate or location measurement value. For example, in step 3b, a capability information transfer procedure may be performed. Specifically, the LMF may transmit a request for capability information to the UE and the UE may transmit the capability information to the LMF. Here, the capability information may include information about a positioning method supportable by the LFM or the UE, information about various aspects of a particular positioning method, such as various types of assistance data for an A-GNSS, and information about common features not specific to any one positioning method, such as ability to handle multiple LPP transactions. In some cases, the UE may provide the capability information to the LMF although the LMF does not transmit a request for the capability information.

As another example, in step 3b, a location assistance data transfer procedure may be performed. Specifically, the UE may transmit a request for the location assistance data to the LMF and indicate particular location assistance data needed to the LMF. Then, the LMF may transfer corresponding location assistance data to the UE and transfer additional assistance data to the UE in one or more additional LTE positioning protocol (LPP) messages. The location assistance data delivered from the LMF to the UE may be transmitted in a unicast manner. In some cases, the LMF may transfer the location assistance data and/or the additional assistance data to the UE without receiving a request for the assistance data from the UE.

As another example, in step 3b, a location information transfer procedure may be performed. Specifically, the LMF may send a request for the location (related) information associated with the UE to the UE and indicate the type of necessary location information and associated QoS. In response to the request, the UE may transfer the location related information to the LMF. Additionally, the UE may transfer additional location related information to the LMF in one or more LPP messages. Here, the "location related information" may mean all values used for location calculation such as actual location estimate information and radio measurement or location measurement. Typically, the location related information may be a reference signal time difference (RSTD) value measured by the UE based on DL RSs transmitted to the UE by a plurality of NG-RANs and/or E-UTRANs. Similarly to the above description, the UE may transfer the location related information to the LMF without receiving a request from the LMF.

The procedures implemented in step 3b may be performed independently but may be performed consecutively. Generally, although step 3b is performed in order of the capability information transfer procedure, the location assistance data transfer procedure, and the location information transfer procedure, step 3b is not limited to such order. In other words, step 3b is not required to occur in specific order in order to improve flexibility in positioning. For example, the UE may request the location assistance data at any time in order to perform a previous request for location measurement made by the LMF. The LMF may also request location information, such as a location measurement value or a location estimate value, at any time, in the case in which location information transmitted by the UE does not satisfy required QoS. Similarly, when the UE does not perform measurement for location estimation, the UE may transmit the capability information to the LMF at any time.

In step 3b, when information or requests exchanged between the LMF and the UE are erroneous, an error message may be transmitted and received and an abort message for aborting positioning may be transmitted and received.

Protocol used in step 3b may be an LPP protocol which will be described later.

Step 3b may be performed additionally after step 3a but may be performed instead of step 3a.

In step 4, the LMF may provide a location service response to the AMF. The location service response may include information as to whether UE positioning is successful and include a location estimate value of the UE. If the procedure of FIG. 8 has been initiated by step 1a, the AMF may transfer the location service response to a 5GC entity such as a GMLC. If the procedure of FIG. 8 has been initiated by step 1b, the AMF may use the location service response in order to provide a location service related to an emergency call.

Protocol for Location Measurement

LTE Positioning Protocol (LPP)

Figure 9:
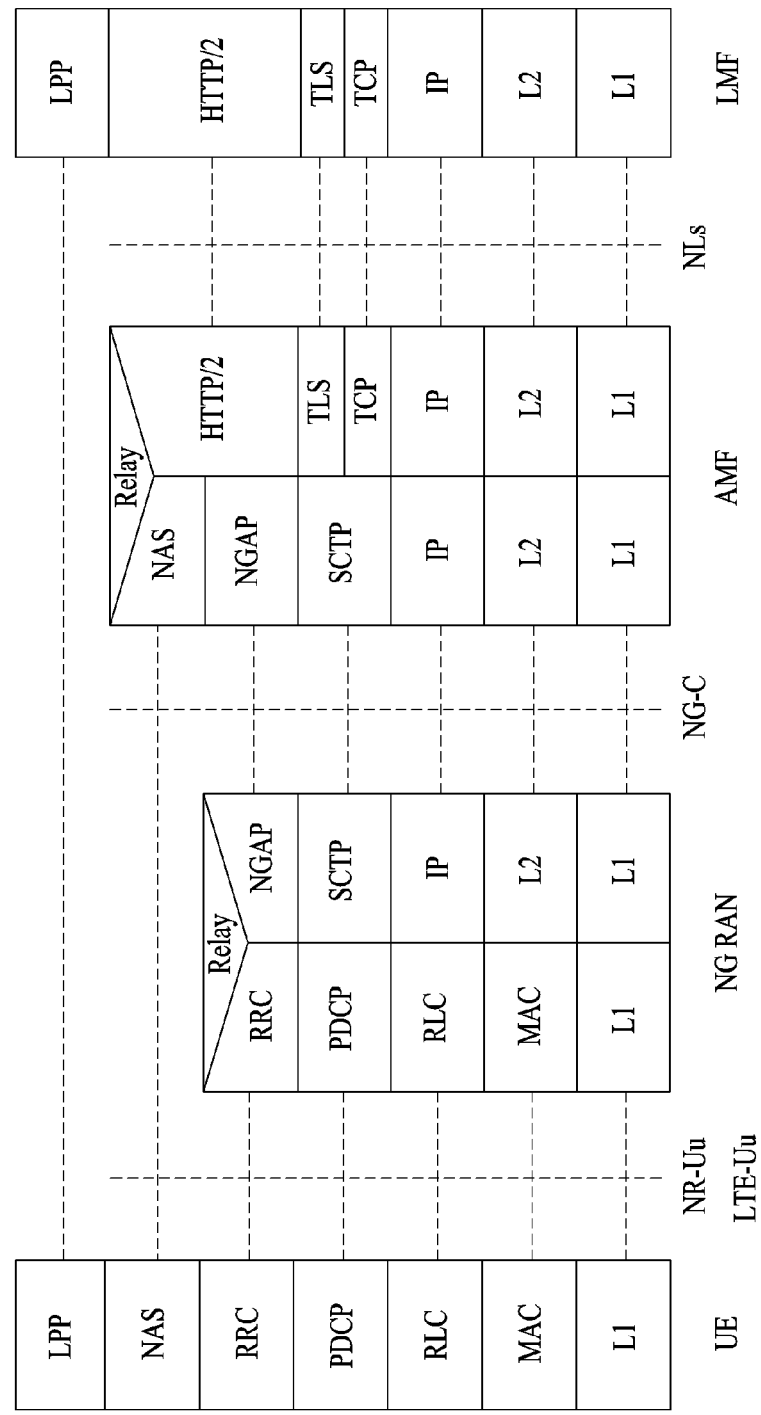
FIG. 9 illustrates an exemplary protocol layer used to support LTE positioning protocol (LPP) message transfer.
Figure 11:
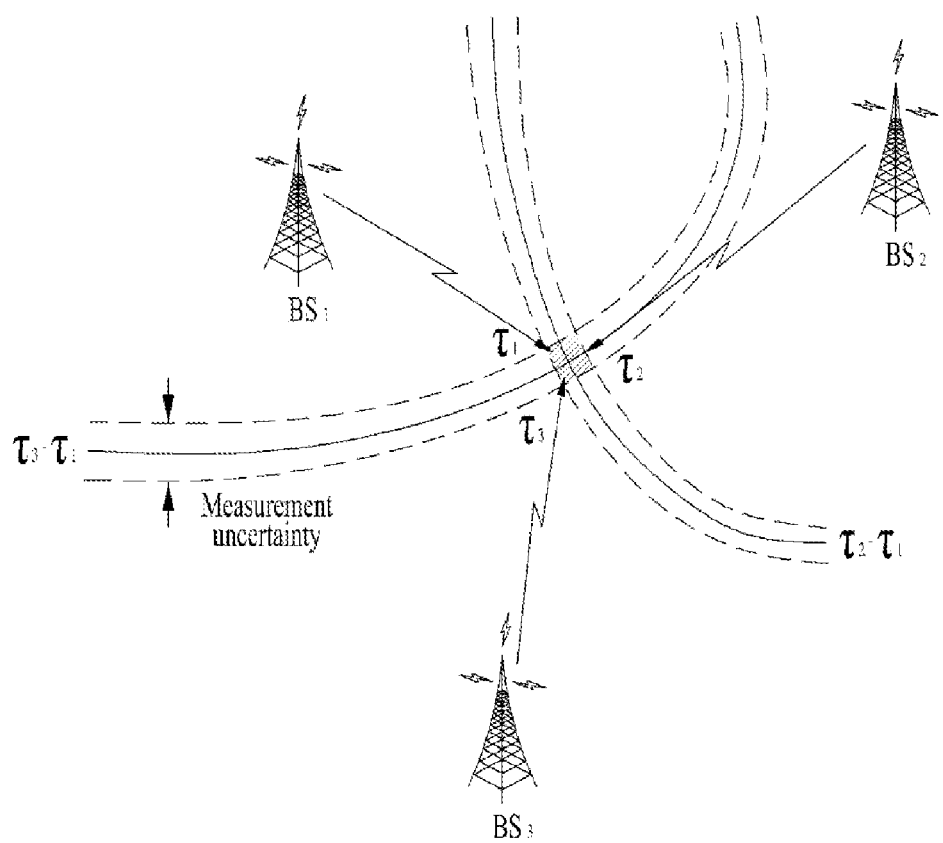
FIG. 11 is a view illustrating an embodiment of an observed time difference of arrival (OTDOA) positioning method.

FIG. 9 illustrates an exemplary protocol layer used to support LPP message transfer between an LMF and a UE. An LPP protocol data unit (PDU) may be carried in a NAS PDU between an AMF and the UE. Referring to FIG. 11, LPP is terminated between a target device (e.g., a UE in a control plane or an SUPL enabled terminal (SET) in a user plane) and a location server (e.g., an LMF in the control plane or an SLP in the user plane). LPP messages may be carried as transparent PDUs cross intermediate network interfaces using appropriate protocols, such an NGAP over an NG-C interface and NAS/RRC over LTE-Uu and NR-Uu interfaces. LPP is intended to enable positioning for NR and LTE using various positioning methods.

For example, a target device and a location server may exchange, through LPP, capability information therebetween, assistance data for positioning, and/or location information. The target device and the location server may exchange error information and/or indicate abort of an LPP procedure, through an LPP message.

(2) NR Positioning Protocol A (NRPPa)

Figure 10:
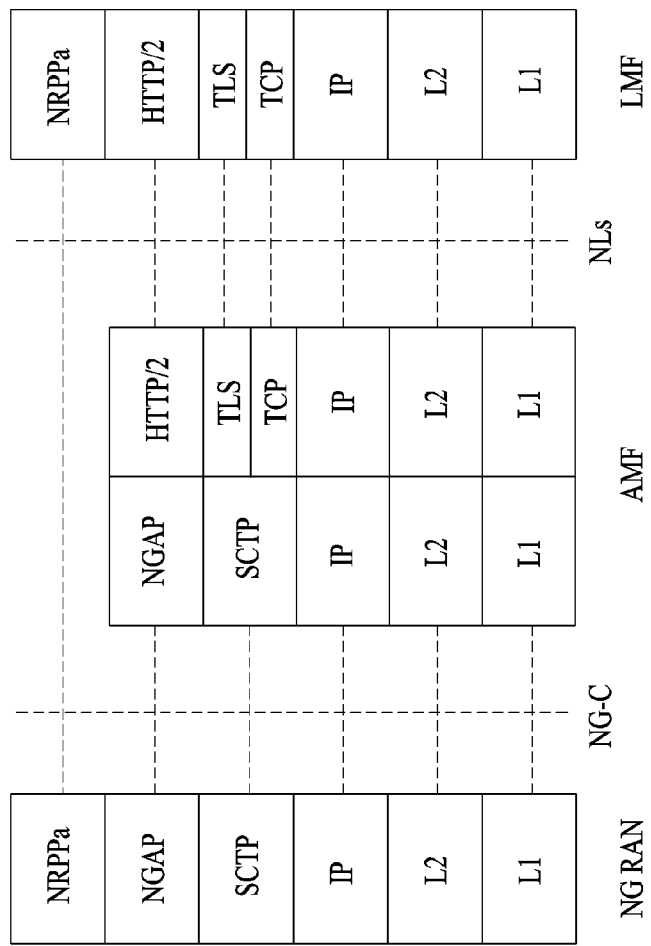
FIG. 10 is a view illustrating an exemplary protocol layer used to support NR positioning protocol A (NRPPa) protocol data unit (PDU) transfer.

FIG. 10 illustrates an exemplary protocol layer used to support NRPPa PDU transfer between an LMF and an NG-RAN node. NRPPa may be used to carry information between an NG-RAN node and an LMF. Specifically, NRPPa may carry an E-CID for measurement transferred from an ng-eNB to an LMF, data for support of an OTDOA positioning method, and a cell-ID and a cell position ID for support of an NR cell ID positioning method. An AMF may route NRPPa PDUs based on a routing ID of an involved LMF over an NG-C interface without information about related NRPPa transaction.

An NRPPa procedure for location and data collection may be divided into two types. The first type is a UE associated procedure for transfer of information about a particular UE (e.g., location measurement information) and the second type is a non-UE-associated procedure for transfer of information applicable to an NG-RAN node and associated TPs (e.g., gNB/ng-eNB/TP timing information). The two types may be supported independently or may be supported simultaneously.

Positioning Measurement Method

Positioning methods supported in the NG-RAN may include a GNSS, an OTDOA, an E-CID, barometric sensor positioning, WLAN positioning, Bluetooth positioning, a TBS, uplink time difference of arrival (UTDOA) etc. Although any one of the positioning methods may be used for UE positioning, two or more positioning methods may be used for UE positioning.

Observed Time Difference Of Arrival (OTDOA)

FIG. 11 is a view illustrating an OTDOA positioning method. The OTDOA positioning method uses time measured for DL signals received from multiple TPs including an eNB, an ng-eNB, and a PRS-only TP by the UE. The UE measures time of received DL signals using location assistance data received from a location server. The position of the UE may be determined based on such a measurement result and geographical coordinates of neighboring TPs.

The UE connected to the gNB may request measurement gaps to perform OTDOA measurement from a TP. If the UE is not aware of an SFN of at least one TP in OTDOA assistance data, the UE may use autonomous gaps to obtain an SFN of an OTDOA reference cell prior to requesting measurement gaps for performing reference signal time difference (RSTD) measurement.

Here, the RSTD may be defined as the smallest relative time difference between two subframe boundaries received from a reference cell and a measurement cell. That is, the RSTD may be calculated as the relative time difference between the start time of a subframe received from the measurement cell and the start time of a subframe from the reference cell that is closest to the subframe received from the measurement cell. The reference cell may be selected by the UE.

For accurate OTDOA measurement, it is necessary to measure time of arrival (ToA) of signals received from geographically distributed three or more TPs or BSs. For example, ToA for each of TP 1, TP 2, and TP 3 may be measured, and RSTD for TP 1 and TP 2, RSTD for TP 2 and TP 3, and RSTD for TP 3 and TP 1 are calculated based on three ToA values. A geometric hyperbola is determined based on the calculated RSTD values and a point at which curves of the hyperbola cross may be estimated as the position of the UE. In this case, accuracy and/or uncertainty for each ToA measurement may occur and the estimated position of the UE may be known as a specific range according to measurement uncertainty.

For example, RSTD for two TPs may be calculated based on Equation 3 below.

$$RSTDi, 1 = \frac{\sqrt{(x_t - x_i)^2 + (y_t - y_i)^2}}{c} - \frac{\sqrt{(x_t - x_i)^2 + (y_t - y_1)^2}}{c} + (Ti - T1) + (ni - n1)$$ [Equation 3]

where c is the speed of light, $\{x_t, y_t\}$ are (unknown) coordinates of a target UE, $\{x_i, y_i\}$ are (known) coordinates of a TP, and $\{x_1, y_1\}$ are coordinates of a reference TP (or another TP). Here, $(T_i - T_1)$ is a transmission time offset between two TPs, referred to as "real time differences" (RTDs), and $n_i$ and $n_1$ are UE ToA measurement error values.

(2) Enhanced Cell ID (E-CID)

In a cell ID (CID) positioning method, the position of the UE may be measured based on geographical information of a serving ng-eNB, a serving gNB, and/or a serving cell of the UE. For example, the geographical information of the serving ng-eNB, the serving gNB, and/or the serving cell may be acquired by paging, registration, etc.

The E-CID positioning method may use additional UE measurement and/or NG-RAN radio resources in order to improve UE location estimation in addition to the CID positioning method. Although the E-CID positioning method partially may utilize the same measurement methods as a measurement control system on an RRC protocol, additional measurement only for UE location measurement is not generally performed. In other words, an additional measurement configuration or measurement control message may not be provided for UE location measurement. The UE does not expect that an additional measurement operation only for location measurement will be requested and the UE may report a measurement value obtained by generally measurable methods.

For example, the serving gNB may implement the E-CID positioning method using an E-UTRA measurement value provided by the UE.

Measurement elements usable for E-CID positioning may be, for example, as follows.

UE measurement: E-UTRA reference signal received power (RSRP), E-UTRA reference signal received quality (RSRQ), UE E-UTRA reception (RX)-transmission (TX) time difference, GERAN/WLAN reference signal strength indication (RSSI), UTRAN common pilot channel (CPICH) received signal code power (RSCP), and/or UTRAN CPICH Ec/Io E-UTRAN measurement: ng-eNB RX-TX time difference, timing advance (Taw), and/or AoA Here, $T_{ADV}$ may be divided into Type 1 and Type 2 as follows.

$T_{ADV}$ Type 1=(ng-eNB RX-TX time difference)+(UE E-UTRA RX-TX time difference)

$T_{ADV}$ Type 2=ng-eNB RX-TX time difference

AoA may be used to measure the direction of the UE. AoA is defined as the estimated angle of the UE counterclockwise from the eNB/TP. In this case, a geographical reference direction may be north. The eNB/TP may use a UL signal such as an SRS and/or a DMRS for AoA measurement. The accuracy of measurement of AoA increases as the arrangement of an antenna array increases. When antenna arrays are arranged at the same interval, signals received at adjacent antenna elements may have constant phase rotate.

(3) Uplink Time Difference of Arrival (UTDOA)

UTDOA is to determine the position of the UE by estimating the arrival time of an SRS. When an estimated SRS arrival time is calculated, a serving cell is used as a reference cell and the position of the UE may be estimated by the arrival time difference with another cell (or an eNB/TP). To implement UTDOA, an E-SMLC may indicate the serving cell of a target UE in order to indicate SRS transmission to the target UE. The E-SMLC may provide configurations such as periodic/non-periodic SRS, bandwidth, and frequency/group/sequence hopping.

Figure 12:
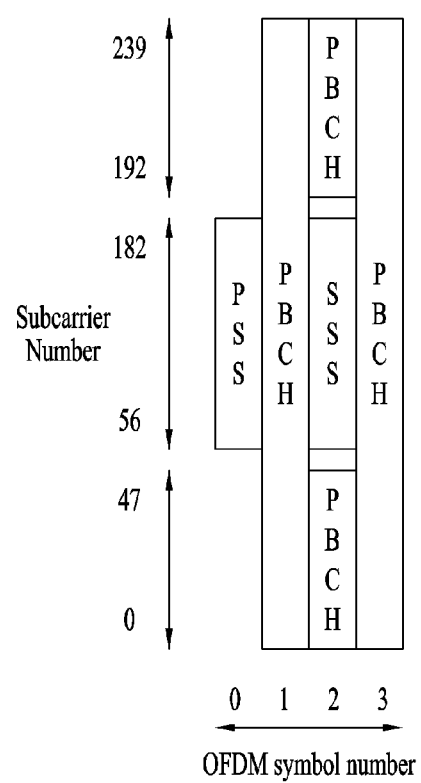
FIGS. 12 and 13 are views illustrating a structure and a method for transmission of a synchronization signal block (SSB) used in an NR system.
Figure 13:
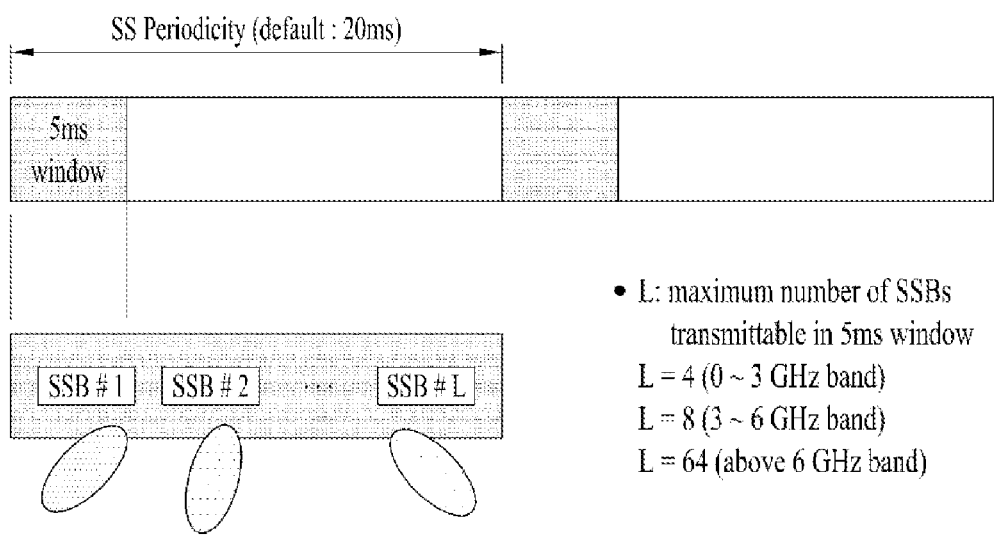

FIG. 12 illustrates an SSB structure. The UE may perform cell search, system information acquisition, beam alignment for initial access, DL measurement, etc. based on the SSB. The SSB and synchronization signal/physical broadcast channel (SS/PBCH) block are interchangeably used.

Referring to FIG. 12, an SSB includes a PSS, an SSS, and a PBCH. The SSB is configured over four consecutive OFDM symbols, and the PSS, PBCH, SSS/PBCH, and PBCH are transmitted on the respective OFDM symbols. The PSS and SSS may each consist of 1 OFDM symbol and 127 subcarriers, and the PBCH may consist of 3 OFDM symbols and 576 subcarriers. Polar coding and quadrature phase shift keying (QPSK) are applied to the PBCH. The PBCH may have a data RE and a demodulation reference signal (DMRS) RE for each OFDM symbol. There may be three DMRS REs for each RB, and there may be three data REs between DMRS REs.

The cell search refers to a procedure in which the UE acquires time/frequency synchronization of a cell and detects a cell ID (e.g., physical layer cell ID (PCID)) of the cell. The PSS may be used in detecting a cell ID within a cell ID group, and the SSS may be used in detecting a cell ID group. The PBCH may be used in detecting an SSB (time) index and a half-frame.

The cell search procedure of the UE may be summarized as shown in Table 3 below.

TABLE 3

| | Type of Signals | Operations |
|---|---|---|
| 1st step | PSS | SS/PBCH block (SSB) symbol timing acquisition Cell ID detection within a cell ID group (3 hypothesis) |
| 2nd Step | SSS | * Cell ID group detection (336 hypothesis) |
| 3rd Step | PBCH DMRS | SSB index and Half frame (HF) index (Slot and frame boundary detection) |
| 4th Step | PBCH | Time information (80 ms, System Frame Number (SFN), SSB index, HF) * Remaining Minimum System Information (RMSI) Control resource set (CORESET)/ Search space configuration |
| 5th Step | PDCCH and PDSCH | Cell access information * RACH configuration |

There may be 336 cell ID groups, and each cell ID group may have three cell IDs. There may be 1008 cell IDs in total. Information about a cell ID group to which a cell ID of a cell belongs may be provided/acquired through the SSS of the cell, and information about the cell ID among 336 cells in the cell ID may be provided/acquired through the PSS.

Figure 15:
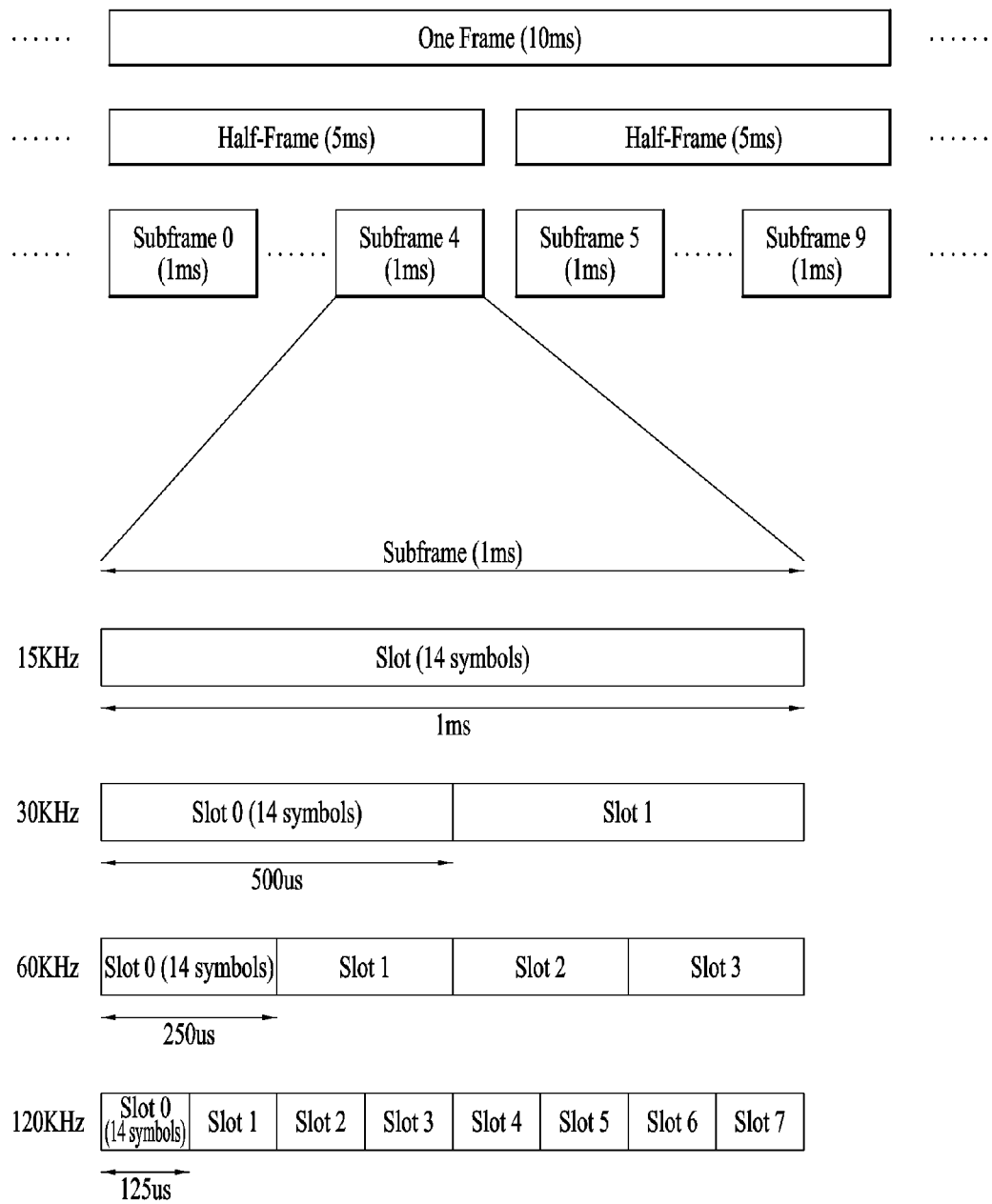
FIGS. 15 to 17 are views illustrating structures of a radio frame and slots used in a new RAT (NR) system.

FIG. 15 illustrates SSB transmission. Referring to FIG. 15, the SSB is periodically transmitted in accordance with the SSB periodicity. The basic SSB periodicity assumed by the UE in the initial cell search is defined as 20 ms. After cell access, the SSB periodicity may be set to one of {5 ms, 10 ms, 20 ms, 40 ms, 80 ms, 160 ms} by the network (e.g., the BS). A SSB burst set may be configured at the beginning of the SSB periodicity. The SSB burst set may be configured with a 5 ms time window (i.e., half-frame), and the SSB may be repeatedly transmitted up to L times within the SS burst set. The maximum number of transmissions of the SSB, L, may be given according to the frequency band of the carrier wave as follows. One slot includes up to two SSBs.

For frequency range up to 3 GHz, L=4
For frequency range from 3 GHz to 6 GHz, L=8
For frequency range from 6 GHz to 52.6 GHz, L=64

The time position of an SSB candidate in the SS burst set may be defined according to the SCS as follows. The time position of the SSB candidate is indexed from 0 to L−1 in temporal order within the SSB burst set (i.e., half-frame) (SSB index).

Case A—15 kHz SCS: The index of the start symbol of a candidate SSB is given as {2, 8}+14*n. When the carrier frequency is lower than or equal to 3 GHz, n=0, 1. When the carrier frequency is 3 GHz to 6 GHz, n=0, 1, 2, 3.

Case B—30 kHz SCS: The index of the start symbol of a candidate SSB is given as {4, 8, 16, 20}+28*n. When the carrier frequency is lower than or equal to 3 GHz, n=0. When the carrier frequency is 3 GHz to 6 GHz, n=0, 1.

Case C—30 kHz SCS: The index of the start symbol of a candidate SSB is given as {2, 8}+14*n. When the carrier frequency is lower than or equal to 3 GHz, n=0. When the carrier frequency is 3 GHz to 6 GHz, n=0, 1, 2, 3.

Case D—120 kHz SCS: The index of the start symbol of a candidate SSB is given as {4, 8, 16, 20}+28*n. When the carrier frequency is higher than 6 GHz, n=0, 1, 2, 3, 5, 6, 7, 8, 10, 11, 12, 13, 15, 16, 17, 18.

Case E—240 kHz SCS: The index of the start symbol of a candidate SSB is given as {8, 12, 16, 20, 32, 36, 40, 44}+56*n. When the carrier frequency is higher than 6 GHz, n=0, 1, 2, 3, 5, 6, 7, 8.

CSI Related Behavior

In a new radio (NR) system, a CSI-RS is used for time and/or frequency tracking, CSI computation, RSRP calculation, and mobility. Here, CSI computation is related to CSI acquisition, and RSRP computation is related to beam management (BM).

Figure 14:
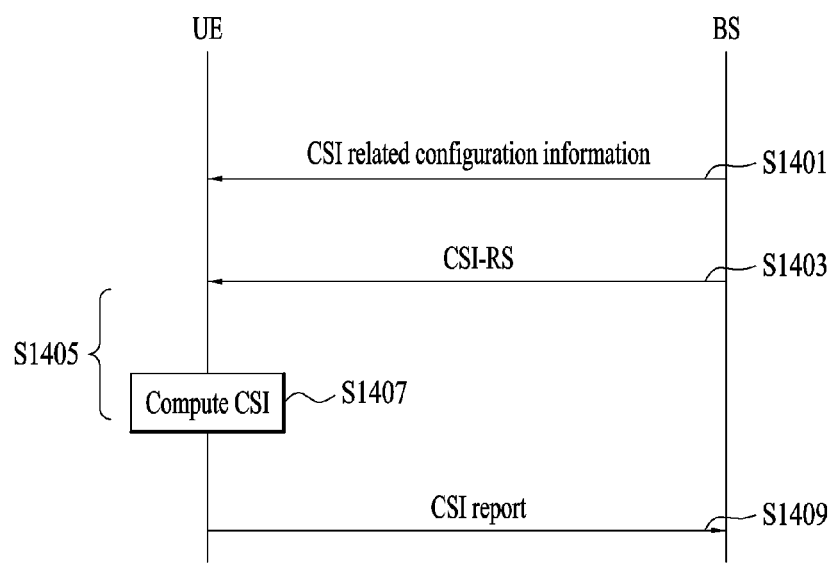
FIG. 14 is a view illustrating a reporting procedure of channel state information (CSI).

FIG. 14 is a flowchart illustrating an exemplary CSI related procedure.

To perform one of the above purposes of the CSI-RS, the UE receives configuration information related to CSI from the BS through RRC signaling (S1401).

The CSI related configuration information may include at least one of CSI-interference management (IM) resource related information, CSI measurement configuration related information, CSI resource configuration related information, CSI-RS resource related information, or CSI report configuration related information.

The CSI-IM resource related information may include CSI-IM resource information, CSI-IM resource set information, etc. A CSI-IM resource set is identified by a CSI-IM resource set identifier (ID), and one resource set includes at least one CSI-IM resource. Each CSI-IM resource is identified by a CSI-IM resource ID.

The CSI resource configuration related information may be expressed as a CSI-ResourceConfig information element (IE). The CSI resource configuration related information defines a group including at least one of a non-zero power (NZP) CSI-RS resource set, a CSI-IM resource set, or a CSI-SSB resource set. That is, the CSI resource configuration related information includes a CSI-RS resource set list. The CSI-RS resource set list may include at least one of an NZP CSI-RS resource set list, a CSI-IM resource set list, or a CSI-SSB resource set list. The CSI-RS resource set is identified by a CSI-RS resource set ID, and one resource set includes at least one CSI-RS resource. Each CSI-RS resource is identified by a CSI-RS resource ID.

RRC parameters (e.g., a BM related "repetition" parameter and a tracking related "trs-Info" parameter) indicating usage of a CSI-RS for each NZP CSI-RS resource set may be configured.

iii) The CSI report configuration related information includes a report configuration type parameter (reportConfigType) indicative of a time domain behavior and a report quantity parameter (reportQuantity) indicative of a CSI related quantity to be reported. The time domain behavior may be periodic, aperiodic, or semi-persistent.

The UE measures CSI based on the CSI related configuration information (S1403). Measuring the CSI may include (1) receiving a CSI-RS by the UE (S1405) and (2) computing the CSI based on the received CSI-RS (S1407). For the CSI-RS, RE mapping of CSI-RS resources is configured in time and frequency domains by an RRC parameter CSI-RS-ResourceMapping.

The UE reports the measured CSI to the BS (S1409).

CSI Measurement

The NR system supports more flexible and dynamic CSI measurement and reporting. The CSI measurement may include receiving a CSI-RS, and acquiring CSI by computing the received CSI-RS.

As time domain behaviors of CSI measurement and reporting, channel measurement (CM) and interference measurement (IM) are supported.

A CSI-IM-based interference measurement resource (IMR) of NR has a design similar to CSI-IM of LTE and is configured independent of ZP CSI-RS resources for PDSCH rate matching.

At each port of a configured NZP CSI-RS-based IMR, the BS transmits an NZP CSI-RS to the UE.

If there is no PMI or RI feedback for a channel, a plurality of resources is configured in a set and the BS or network indicates, through DCI, a subset of NZP CSI-RS resources for CM/IM.

Resource setting and resource setting configuration will be described in more detail.

Resource Setting

Each CSI resource setting "CSI-ResourceConfig" includes configuration of S(≥1) CSI resource sets (which are given by RRC parameter csi-RS-ResourceSetList). A CSI resource setting corresponds to CSI-RS-resourcesetlist. Here, S represents the number of configured CSI-RS resource sets. Configuration of S(≥1) CSI resource sets includes each CSI resource set including CSI-RS resources (composed of NZP CSI-RS or CSI-IM), and an SS/PBCH block (SSB) resource used for RSRP computation.

Each CSI resource setting is positioned at a DL bandwidth part (BWP) identified by RRC parameter bwp-id. All CSI resource settings linked to a CSI reporting setting have the same DL BWP.

In a CSI resource setting included in a CSI-ResourceConfig IE, a time domain behavior of a CSI-RS resource may be indicated by RRC parameter resourceType and may be configured to be aperiodic, periodic, or semi-persistent.

One or more CSI resource settings for CM and IM are configured through RRC signaling. A channel measurement resource (CMR) may be an NZP CSI-RS for CSI acquisition, and an interference measurement resource (IMR) may be an NZP CSI-RS for CSI-IM and for IM. Here, CSI-IM (or a ZP CSI-RS for IM) is mainly used for inter-cell interference measurement. An NZP CSI-RS for IM is mainly used for intra-cell interference measurement from multiple users.

The UE may assume that CSI-RS resource(s) for CM and CSI-IM/NZP CSI-RS resource(s) for IM configured for one CSI reporting are "QCL-TypeD" for each resource.

Resource Setting Configuration

A resource setting may represent a resource set list.

When one resource setting is configured, a resource setting (given by RRC parameter resourcesForChannelMeasurement) is about channel measurement for RSRP computation.

When two resource settings are configured, the first resource setting (given by RRC parameter resourcesForChannelMeasurement) is for channel measurement and the second resource setting (given by csi-IM-ResourcesForInterference or nzp-CSI-RS-ResourcesForInterference) is for CSI-IM or for interference measurement performed on an NZP CSI-RS.

When three resource settings are configured, the first resource setting (given by resourcesForChannelMeasurement) is for channel measurement, the second resource setting (given by csi-IM-ResourcesForInterference) is for CSI-IM based interference measurement, and the third resource setting (given by nzp-CSI-RS-ResourcesForInterference) is for NZP CSI-RS based interference measurement.

When one resource setting (given by resourcesForChannelMeasurement) is configured, the resource setting is about channel measurement for RSRP computation.

When two resource settings are configured, the first resource setting (given by resourcesForChannelMeasurement) is for channel measurement, and the second resource setting (given by RRC parameter csi-IM-ResourcesForInterference) is used for interference measurement performed on CSI-IM.

CSI Computation

If interference measurement is performed on CSI-IM, each CSI-RS resource for channel measurement is associated with a CSI-RS resource in order of CSI-RS resources and CSI-IM resources in a corresponding resource set. The number of CSI-RS resources for channel measurement is the same as the number of CSI-IM resources.

For CSI measurement, the UE assumes the following.

Each NZP CSI-RS port configured for interference measurement corresponds to an interference transmission layer.

Every interference transmission layer of NZP CSI-RS ports for interference measurement considers an energy per resource element (EPRE) ratio.

Different interference signals are assumed on RE(s) of an NZP CSI-RS resource for channel measurement, an NZP CSI-RS resource for interference measurement, or a CSI-IM resource for interference measurement.

CSI Reporting

For CSI reporting, time and frequency resources available for the UE are controlled by the BS.

Regarding a CQI, PMI, CSI-RS resource indicator (CRI), SS/PBCH block resource indicator (SSBRI), layer indicator (LI), RI, or L1-RSRP, the UE receives RRC signaling including N(≥1) CSI-ReportConfig reporting settings, M(≥1) CSI-ResourceConfig resource settings, and a list of one or two trigger states (provided by aperiodicTriggerStateList and semiPersistentOnPUSCH-TriggerStateList). In aperiodicTriggerStateList, each trigger state includes a channel and optionally a list of associated CSI-ReportConfigs indicative of resource set IDs for interference. In semiPersistentOnPUSCH-TriggerStateList, each trigger state includes one associated CSI-ReportConfig.

That is, for each CSI-RS resource setting, the UE transmits CSI reporting indicated by CSI-ReportConfigs associated with the CSI-RS resource setting to the BS. For example, the UE may report at least one of the CQI, PMI, CRI, SSBRI, LI, RI, or RSRP as indicated by CSI-ReportConfigs associated with the CSI resource setting. However, if CSI-ReportConfigs associated with the CSI resource setting indicates "none", the UE may skip reporting of the CSI or RSRP associated with the CSI resource setting. The CSI resource setting may include a resource for an SS/PBCH block.

FIG. 15 illustrates a structure of a radio frame used in NR.

In NR, UL and DL transmissions are configured in frames. The radio frame has a length of 10 ms and is defined as two 5 ms half-frames (HF). The half-frame is defined as five 1 ms subframes (SF). A subframe is divided into one or more slots, and the number of slots in a subframe depends on subcarrier spacing (SCS). Each slot includes 12 or 14 OFDM(A) symbols according to a cyclic prefix (CP). When a normal CP is used, each slot includes 14 symbols. When an extended CP is used, each slot includes 12 symbols. Here, the symbols may include OFDM symbols (or CP-OFDM symbols) and SC-FDMA symbols (or DFT-s-OFDM symbols).

Table 4 illustrates that the number of symbols per slot, the number of slots per frame, and the number of slots per subframe vary according to the SCS when the normal CP is used.

TABLE 4

| SCS (15*2^u) | | | |
|---|---|---|---|
| | $N_{symb}^{slot}$ | $N_{slot}^{frame, u}$ | $N_{slot}^{subframe, u}$ |
| 15 KHz (u = 0) | 14 | 10 | 1 |
| 30 KHz (u = 1) | 14 | 20 | 2 |
| 60 KHz (u = 2) | 14 | 40 | 4 |
| 120 KHz (u = 3) | 14 | 80 | 8 |
| 240 KHz (u = 4) | 14 | 160 | 16 |

$N_{symb}^{slot}$: Number of symbols in a slot
$N_{slot}^{frame, u}$: Number of slots in a frame
$N_{slot}^{subframe, u}$: Number of slots in a subframe Table 5 illustrates that the number of symbols per slot, the number of slots per frame, and the number of slots per subframe vary according to the SCS when the extended CP is used.

TABLE 5

| SCS (15*2^u) | | | |
|---|---|---|---|
| | $N_{symb}^{slot}$ | $N_{slot}^{frame, u}$ | $N_{slot}^{subframe, u}$ |
| 60 KHz (u = 2) | 12 | 40 | 4 |

In the NR system, the OFDM(A) numerology (e.g., SCS, CP length, etc.) may be configured differently among a plurality of cells merged for one UE. Thus, the (absolute time) duration of a time resource (e.g., SF, slot or TTI) (referred to as a time unit (TU) for simplicity) composed of the same number of symbols may be set differently among the merged cells.

Figure 16:
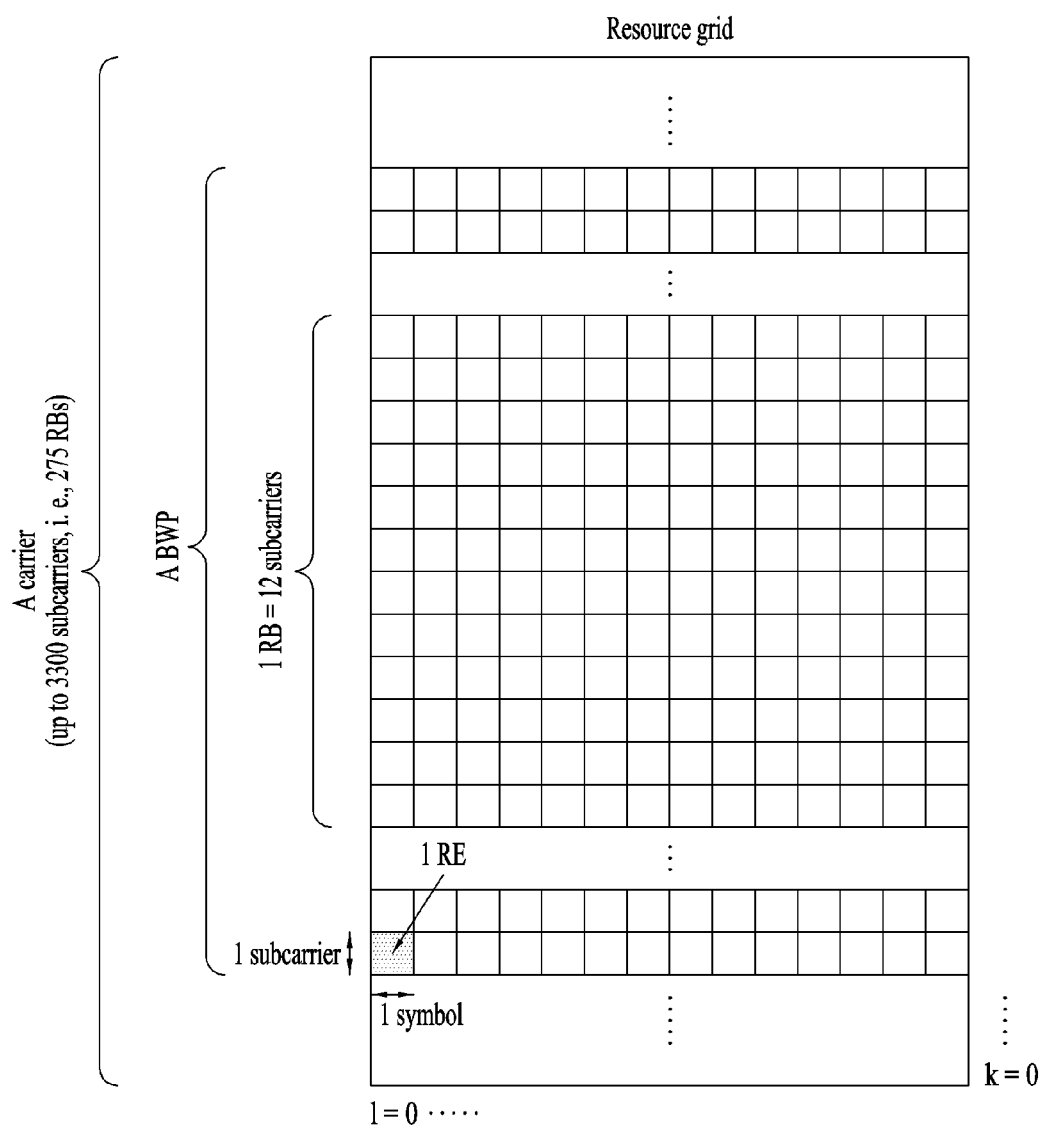

FIG. 16 illustrates a slot structure of an NR frame. A slot includes a plurality of symbols in the time domain. For example, in the case of the normal CP, one slot includes seven symbols. On the other hand, in the case of the extended CP, one slot includes six symbols. A carrier includes a plurality of subcarriers in the frequency domain. A resource block (RB) is defined as a plurality of consecutive subcarriers (e.g., 12 consecutive subcarriers) in the frequency domain. A bandwidth part (BWP) is defined as a plurality of consecutive (P)RBs in the frequency domain and may correspond to one numerology (e.g., SCS, CP length, etc.). A carrier may include up to N (e.g., five) BWPs. Data communication is performed through an activated BWP, and only one BWP may be activated for one UE. In the resource grid, each element is referred to as a resource element (RE), and one complex symbol may be mapped thereto.

Figure 17:
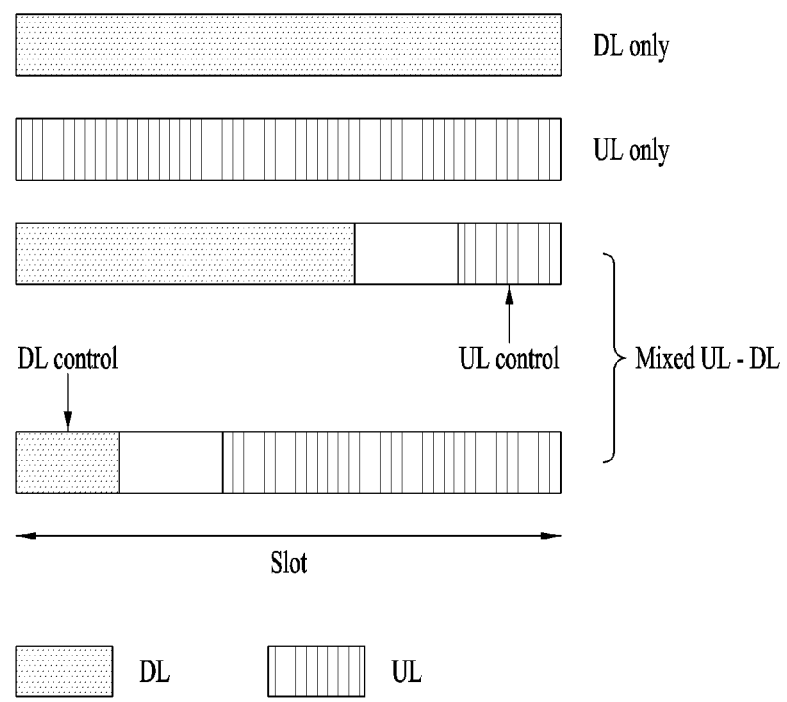

FIG. 17 illustrates a structure of a self-contained slot. In the NR system, a frame has a self-contained structure in which a DL control channel, DL or UL data, a UL control channel, and the like may all be contained in one slot. For example, the first N symbols (hereinafter, DL control region) in the slot may be used to transmit a DL control channel, and the last M symbols (hereinafter, UL control region) in the slot may be used to transmit a UL control channel. N and M are integers greater than or equal to 0. A resource region (hereinafter, a data region) that is between the DL control region and the UL control region may be used for DL data transmission or UL data transmission. For example, the following configuration may be considered. Respective sections are listed in a temporal order.

1. DL only configuration
2. UL only configuration
3. Mixed UL-DL configuration
   DL region+Guard period (GP)+UL control region
   DL control region+GP+UL region
   DL region: (i) DL data region, (ii) DL control region+DL data region
   UL region: (i) UL data region, (ii) UL data region+UL control region The PDCCH may be transmitted in the DL control region, and the PDSCH may be transmitted in the DL data region. The PUCCH may be transmitted in the UL control region, and the PUSCH may be transmitted in the UL data region. Downlink control information (DCI), for example, DL data scheduling information, UL data scheduling information, and the like, may be transmitted on the PDCCH. Uplink control information (UCI), for example, ACK/NACK information about DL data, channel state information (CSI), and a scheduling request (SR), may be transmitted on the PUCCH. The GP provides a time gap in the process of the UE switching from the transmission mode to the reception mode or from the reception mode to the transmission mode. Some symbols at the time of switching from DL to UL within a subframe may be configured as the GP.

Hereinafter, embodiments of the present disclosure will be described in detail based on the above technical idea. The aforementioned details may be applied to the following embodiments of the present disclosure. For example, operations, functions and terms that are not defined in the following embodiments of the present disclosure may be performed and explained based on the aforementioned details.

The following symbols/abbreviations/terms are used in the embodiments of the present disclosure.

AOA (AoA): angle of arrival
AOD (AoD): angle of departure
CSI-RS: channel state information reference signal
ECID: enhanced cell identifier
GPS: global positioning system
GNSS: global navigation satellite system
LMF: location management function
NRPPa: NR positioning protocol a
OTDOA (OTDoA): observed time difference of arrival
PRS: positioning reference signal
RAT: radio access technology
RS: reference signal
RTT: round trip time
RSTD: reference signal time difference/relative signal time difference
SRS: sounding reference signal
TDOA (TDoA): time difference of arrival
TOA (ToA): time of arrival
TRP: transmission reception point
UTDOA (UTDoA): uplink time difference of arrival To estimate the location of a UE based on UE positioning methods such as an OTDOA, a multi-cell RTT, etc., it is necessary to obtain a ToA measurement based on a DL RS such as a PRS, a CSI-RS, and an SS/PBCH block. However, the reliability and/or accuracy of the measured ToA may vary depending on the presence or absence of a line of sight (LoS) component or the signal strength/power of a first path. In some cases, the measured ToA may not correspond to the first arrival path.

Figure 18:
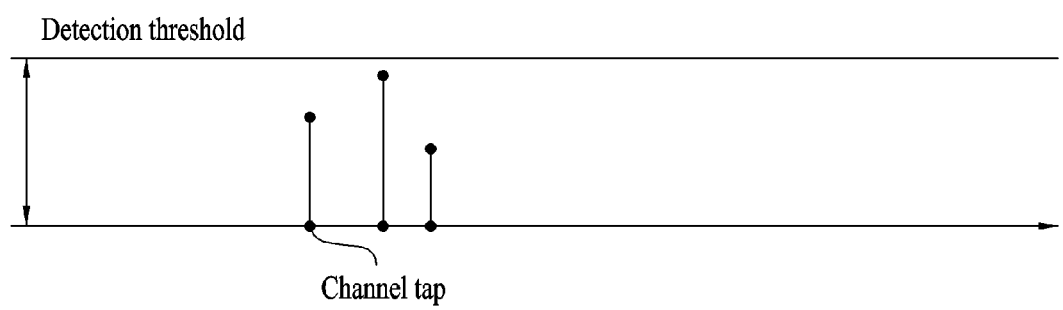
FIG. 18 is a diagram for explaining an embodiment in which a UE measures a time of arrival (ToA).

When the UE measures a ToA for an RS such as a PRS, a CSI-RS, and an SS/PBCH block transmitted from a specific TP/BS, all channel taps may be lower than or similar to a specific threshold (e.g., noise level) as shown in FIG. 18.

As a result, the ToA measurement may be practically impossible, or the measurement reliability may be quite low.

The measurement reliability/quality may be similarly considered not only for the ToA measurement but also for various measurements such an RSTD, an angle-related measurement (AoA), a UE RX-TX time difference, etc. in a similar way.

Thus, the UE may declare/define detection failure for the measurement such as the ToA/RSTD/AoA/UE RX-TX time difference obtained from the RS (e.g., PRS) transmitted by the specific TP/BS/cell and report the detection failure to the BS/LMF. The UE may request/recommend to the BS/LMF to reconfigure RS resources for re-measurement/re-acquisition of the ToA/RSTD/AoA/UE RX-TX time difference measurement. Here, reporting the detection failure to the BS/LMF may correspond to an operation by which the UE informs the BS/LMF that the reliability or quality of the ToA/RSTD/AoA/UE RX-TX time difference measurement is considerably low or not valid. UE operations with the same functionality or related BS/LMF operations may be included in the spirit of the present disclosure.

The following embodiments may be configured/instructed for the detection failure operation.

(1) The LMF/BS may configure/instruct the UE to define a very large value as one of the error values of "OTDOA-MeasQuality", which is a higher layer parameter indicating OTDOA measurement quality, and then report the detection failure. For example, if the UE reports "infinity" as the error value to the LMF/BS, the LMF/BS may recognize that the ToA value is not valid.

(2) A parameter may be introduced to indicate the quality of the AoA/RSTD/UE RX-TX time difference measurement. The quality of the AoA/RSTD/UE RX-TX time difference measurement may also be included as an error value. The UE may be configured to define a very large value as one of the error values reported by the UE.

The operation in which the UE declares/reports the detection failure or the operation in which the UE reports that the ToA/RSTD/UE RX-TX time difference value is not valid may be performed for a specific TP/cell/BS, but the operation may also be performed for a specific PRS resource and/or a specific PRS resource set. For example, the UE may not know which TP/BS transmits the specific PRS resource and/or PRS resource set in an explicit or implicit way. In other words, if the UE is not configured with the identification (ID) of the TP/BS associated with the specific PRS, the UE may not know the TP/BS that has transmitted the specific PRS resource, and only the LMF/BS may know the TP/BS. In the above situation, the following embodiments may be considered for the detection failure operation.

(1) The BS/LMF may configure/indicate to the UE a specific RS (e.g., PRS, CSI-RS, or SS/PBCH block) resource and/or a specific RS (e.g., PRS, CSI-RS, or SS/PBCH block) resource set. In addition, the configured RS resource and/or resource set may be used for UE positioning. When the measurements (e.g., ToA/RSTD/AoA/UE RX-TX time difference) measured by the UE for all RS resources included in the specific RS resource set are less than or equal to a specific threshold, the UE may report the detection failure to the BS/LMF.

(2) When the ToA/RSTD/AOA/UE RX-TX time difference measurement obtained for some X (>0) RS resource sets among a plurality of RS (e.g., PRS, CSI-RS, or SS/PBCH block) resource sets or the quality of the measurement is less than or equal to the specific threshold, the UE may report the detection failure to the BS/LMF.

(3) When the ToA/RSTD/AOA/UE RX-TX time difference measurement obtained for some Y (>0) RS resources among configured RS (e.g., PRS, CSI-RS, or SS/PBCH block) resources or the quality of the measurement is less than or equal to the specific threshold, the UE may report the detection failure to the BS/LMF.

The above-described threshold may be defined/set/used as a default value, and the BS/LMF may separately configure/indicate the specific threshold to the UE.

In addition, based on the above-described detection failure operation, the UE may declare the detection failure for each RS resource and/or RS resource set and then report the detection failure to the BS/LMF. For example, when the measurement for a specific RS resource is less than or equal to the specific threshold, the UE may report the detection failure to the BS/LMF, instead of reporting the measurement. In other words, if the measurement of an RS resource is more than the specific threshold, the UE may report the corresponding measurement. On the other hand, if the measurement of an RS resource is less than or equal to the specific threshold, the UE may report the detection failure state. The BS/LMF may select measurements to be used for positioning based on the received report in order to improve the accuracy of the UE positioning and may strategically determine a positioning method to be used for the UE positioning.

Hereinafter, the embodiments of the present disclosure will be described in detail. All or some of the following embodiments of the present disclosure may be combined to implement another embodiment of the present disclosure unless they are mutually exclusive, which will be clearly understood by those of ordinary skill in the art.

Figure 19:
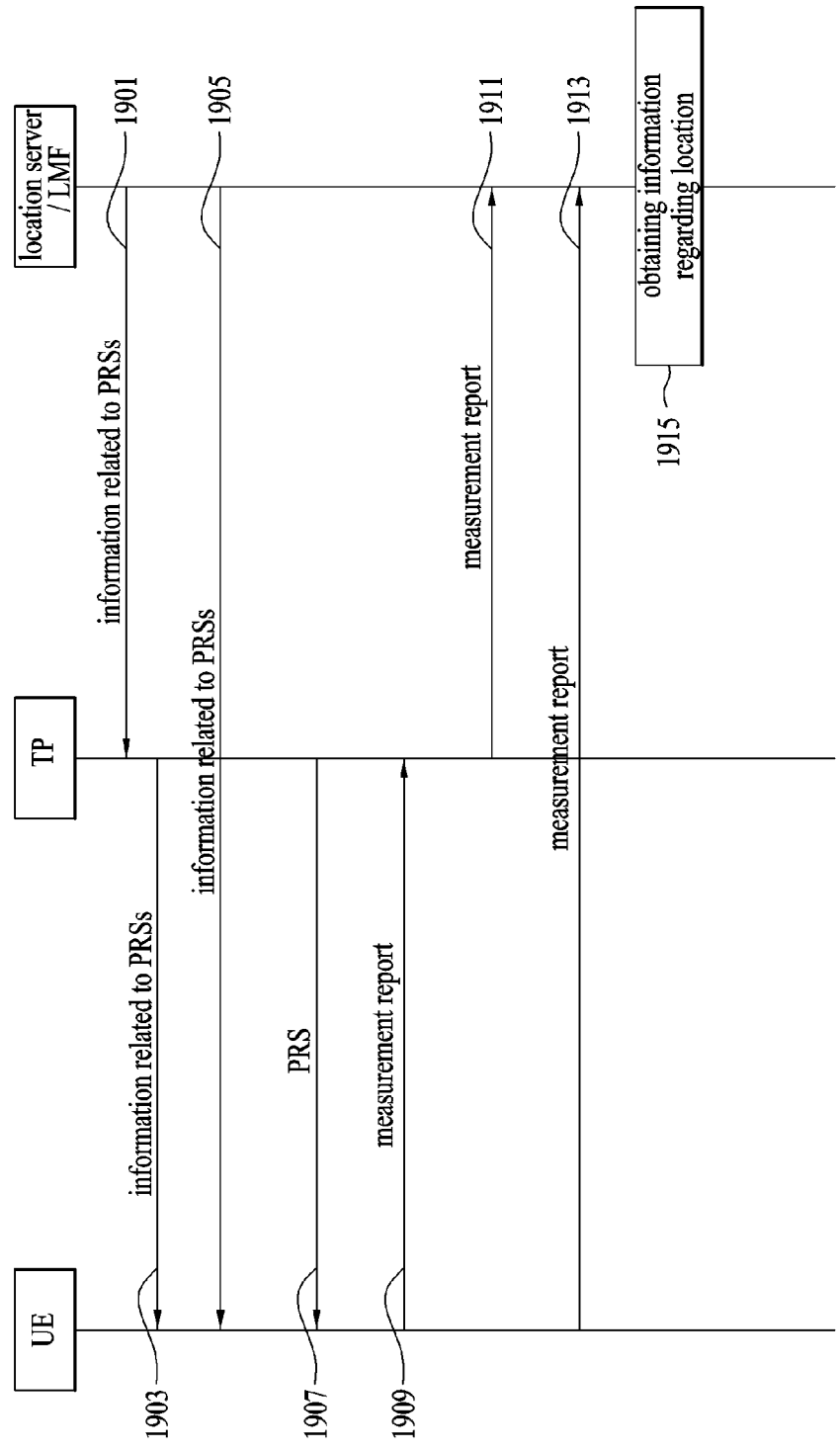
FIG. 19 is a diagram schematically illustrating an operation method for a UE and network nodes according to the present disclosure.

FIG. 19 is a diagram schematically illustrating an operation method for a UE and network nodes according to the present disclosure.

Referring to FIG. 19, for example, in operation 1901, a location server and/or LMF may transmit information on a plurality of PRSs to a TP, and the TP may receive the information. For example, in operation 1903, the TP may forward the information on the plurality of PRSs to a UE, and the UE may receive the information.

For example, in operation 1905, the location server and/or LMF may transmit the information on the plurality of PRSs to the UE, and the UE may receive the information. In this case, for example, operation 1901 and/or operation 1903 may be omitted.

As a contrary example, operation 1905 may be omitted. In this case, for example, operation 1901 and/or operation 1903 may be performed.

That is, operation 1901 and/or operation 1903 and operation 1905 may be alternate.

For example, in operation 1907, the TP may transmit a PRS to the UE, and the UE may receive the plurality of PRSs from a plurality of TPs including the TP. For example, the plurality of PRSs may be related to a plurality of PRS resources.

For example, in operation 1909, the UE may transmit a measurement report to the TP, and the TP may receive the measurement report. For example, in operation 1911, the TP may forward the measurement report to the location server and/or LMF, and the location server and/or LMF may receive measurement report.

For example, in operation 1913, the UE may transmit the measurement report to the location server and/or LMF, and the location server and/or LMF may receive the measurement report. In this case, for example, operation 1909 and/or operation 1911 may be omitted.

As a contrary example, operation 1913 may be omitted. In this case, for example, operation 1909 and/or operation 1913 may be performed.

That is, operation 1909 and/or operation 1911 and operation 1913 may be alternate.

For example, the measurement report may be related to the plurality of PRS resources.

For example, the measurement report may include information on one or more RSTDs measured based on one or more PRS resources among the plurality of PRS resources.

For example, the measurement report may include information on one or more PRS indices related to the one or more PRS resources.

For example, the one or more RSTDs may be related to an OTDOA.

For example, the one or more PRS indices may be related to an AOD.

For example, in operation 1915, the location server and/or LMF may obtain information on the location (and/or positioning) of the UE.

For example, the location server and/or LMF may obtain information on a first estimated location (and/or positioning) of the UE based on the OTDOA related to the one or more RSTDs.

For example, the location server and/or LMF may obtain information on a second estimated location (and/or positioning) of the UE based on the AOD related to the one or more PRS indices.

For example, the location server and/or LMF may obtain the information on the location of the UE based on the information on the first estimated location of the UE and the information on the second estimated location of the UE.

Figure 20:
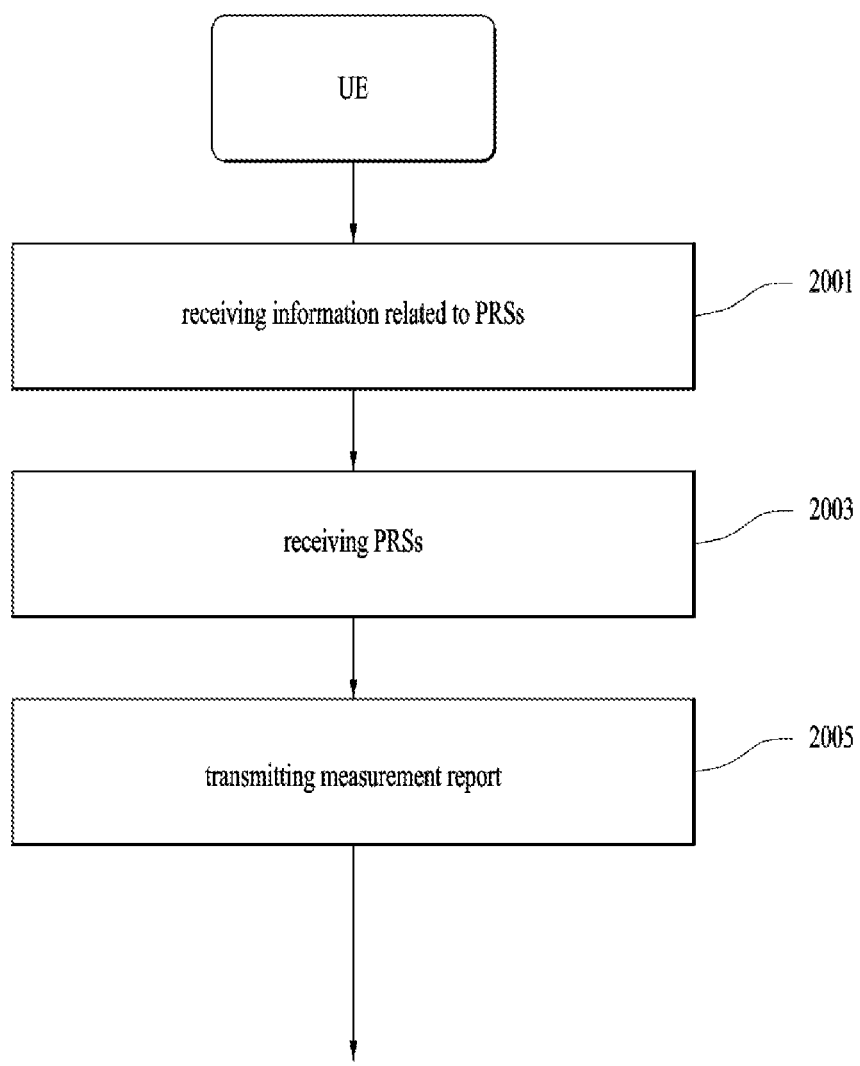
FIG. 20 is a flowchart illustrating an operation method for a UE according to the present disclosure.

FIG. 20 is a flowchart illustrating an operation method for a UE according to the present disclosure.

Referring to FIG. 20, for example, in operation 2001, the UE may receive information on a plurality of PRSs. For example, the plurality of PRSs may be related to a plurality of PRS resources.

For example, in operation 2003, the UE may receive the plurality of PRSs.

For example, in operation 2005, the UE may transmit a measurement report.

For example, the measurement report may be related to the plurality of PRS resources.

For example, the measurement report may include information on one or more RSTDs measured based on one or more PRS resources among the plurality of PRS resources.

For example, the measurement report may include information on one or more PRS indices related to the one or more PRS resources.

For example, the one or more RSTDs may be related to an OTDOA.

For example, the one or more PRS indices may be related to an AOD.

Figure 21:
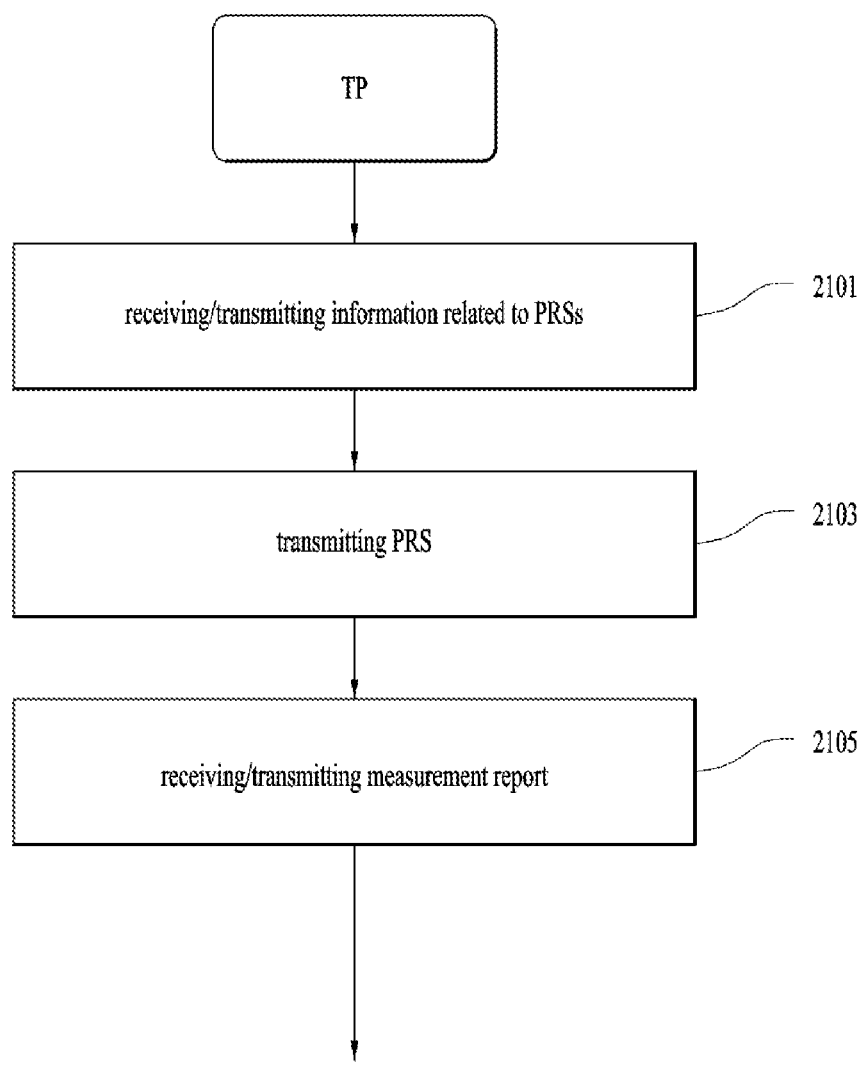
FIG. 21 is a flowchart illustrating an operation method for a transmission point (TP) according to the present disclosure.

FIG. 21 is a flowchart illustrating an operation method for a TP according to the present disclosure.

Referring to FIG. 21, for example, in operation 2101, the TP may receive information on a plurality of PRSs from a location server and/or LMF and forward the corresponding information to a UE. However, for example, when the location server and/or LMF transmits the information on the plurality of PRSs to the UE, operation 2101 may be omitted.

For example, the plurality of PRSs may be related to a plurality of PRS resources.

For example, in operation 2103, the TP may transmit a PRS to the UE. For example, the plurality of PRSs may be transmitted to the UE from a plurality of TPs.

For example, in operation 2105, the TP may receive a measurement report from the UE and forward the measurement report to the location server and/or LMF. However, for example, when the UE transmits the measurement report to the location server and/or LMF, operation 2105 may be omitted.

For example, the measurement report may be related to the plurality of PRS resources.

For example, the measurement report may include information on one or more RSTDs measured based on one or more PRS resources among the plurality of PRS resources.

For example, the measurement report may include information on one or more PRS indices related to the one or more PRS resources.

For example, the one or more RSTDs may be related to an OTDOA.

For example, the one or more PRS indices may be related to an AOD.

Figure 22:
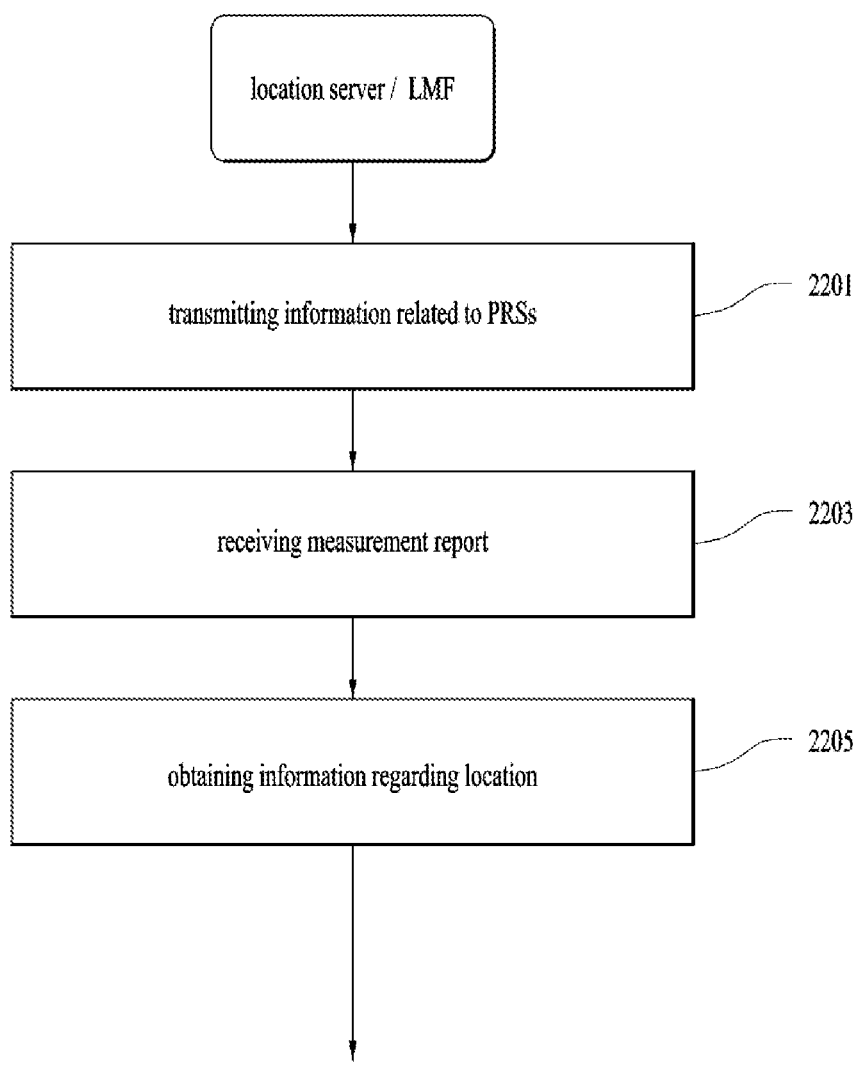
FIG. 22 is a flowchart illustrating an operation method for a network node according to the present disclosure.

FIG. 22 is a flowchart illustrating an operation method for a network node according to the present disclosure. For example, the network node may be a location server and/or LMF. Referring to FIG. 22, for example, in operation 2201, the location server and/or LMF may transmit information on a plurality of PRSs. For example, the plurality of PRSs may be related to a plurality of PRS resources.

For example, in operation 2203, the location server and/or LMF may receive a measurement report.

For example, the measurement report may be related to the plurality of PRS resources.

For example, the measurement report may include information on one or more RSTDs measured based on one or more PRS resources among the plurality of PRS resources.

For example, the measurement report may include information on one or more PRS indices related to the one or more PRS resources.

For example, the one or more RSTDs may be related to an OTDOA.

For example, the one or more PRS indices may be related to an AOD.

For example, in operation 2205, the location server and/or LMF may obtain information on the location (and/or positioning) of the UE.

For example, the location server and/or LMF may obtain information on a first estimated location (and/or positioning) of the UE based on the OTDOA related to the one or more RSTDs.

For example, the location server and/or LMF may obtain information on a second estimated location (and/or positioning) of the UE based on the AOD related to the one or more PRS indices.

For example, the location server and/or LMF may obtain the information on the location of the UE based on the information on the first estimated location of the UE and the information on the second estimated location of the UE.

Particular operations, functions, and terms in the above description may be performed and explained based on the embodiments of the present disclosure, which will be described later.

The UE may report the detection failure for the above-described UE measurements (e.g., ToA/RSTD/AoA/UE RX-TX time difference) in order to inform the BS/LMF that even if the UE reports the measurements by performing configured/indicated measurement, the measurements are not helpful for UE positioning due to significant measurement errors. Thus, when using a specific UE positioning method, the BS/LMF may exclude the measurements corresponding to the detection failure or change PRS resources used for the measurements and allocate the PRS resources to other PRSs.

In the LTE system, when the LMF configures/indicates PRS resources to the UE, the LMF may configure/indicate information about a reference cell/TP and neighboring cells/TPs together. When the UE receives PRSs from a plurality of cells/TPs, if the quality of a ToA/ToF measurement received from the reference cell/TP is low, the UE may change the reference cell/TP and transmit to the LMF/BS information about the changed reference cell/TP and information about neighboring cells/TPs together with an RSTD report.

In the NR system, since each BS/TP transmits PRSs on a plurality of transmission beams, a different ToA/ToF measurement may be obtained for a PRS transmitted on each beam. Among PRS resources transmitted on the plurality of transmission beams, a specific PRS resource related to a minimum propagation time and/or ToA may be a criterion for obtaining/calculating an RSTD measurement. Therefore, in the NR system, when configuring PRSs, the BS may set the specific PRS resource as a reference resource for RSTD acquisition/calculation, instead of setting a reference cell as the criterion for obtaining/calculating the RSTD measurement. For example, a PRS resource set including a plurality of PRS resources may be associated with a specific BS/TP, and each of the plurality of PRS resources may be associated with each of a plurality of transmission beams used by the specific BS/TP. Thus, if the specific PRS resource is set as the reference resource, the UE may know a reference BS/TP and a reference transmission beam and obtain/calculate the RSTD based thereon. However, when one PRS resource is included in a plurality of PRS resource sets, a reference PRS resource set may need to be configured for the UE.

When the BS/LMF configures a PRS resource and/or a PRS resource set to the UE, if the BS/LMF configures/indicates only information about a reference cell/TP and information about neighboring cells/TPs, the UE may provide information a reference PRS resource and/or information about a reference cell together with the information the reference PRS resource to the LMF/BS while reporting an RSTD For example, the BS/LMF may configure information on at least one of a reference cell/TP, a reference PRS resource, or a reference PRS resource set to the UE. In addition, the UE may report information on at least one of a reference cell/TP, a reference PRS resource, and a reference PRS resource set actually used for RSTD measurement. For example, even if the BS/LMF configures information on only a reference cell/TP, the UE may report to the BS/LMF information about a reference cell/TP actually used for RSTD measurement and information about a reference PRS resource corresponding to a reference beam. To improve the accuracy of UE positioning, the UE may report information on a reference PRS resource and/or a reference PRS resource set actually used by the UE to the BS/LMF regardless of the configuration of BS/LMF Additionally, when reporting an RSTD to the LMF/BS, the UE may transmit information on a PRS resource with the smallest ToA/ToF and propagation delay time among a plurality of PRS resources transmitted from each neighboring cell. The PRS resource obtained from the above information may be used to determine a beam to be used when each BS/TP receives a UL reference signal, or the PRS resource may be used to measure AoD information for UE positioning.

Meanwhile, each of a plurality of transmission beams used by one BS/TP may have a different PRS resource and/or a different PRS resource set. For example, one transmission beam may be associated with one PRS resource, and thus, a different PRS resource may be configured for each transmission beam.

For OTDOA-based UE positioning, the UE needs to perform RSTD measurement and reporting. In this case, the accuracy/reliability of a ToA for a PRS transmitted from a reference TP/BS/cell, which corresponds to a reference to measure time differences, is very important. Therefore, when configuring PRSs, the BS/LMF may instruct the UE to receive PRSs from a plurality of cells and measure the ToA without distinguishing a reference cell and neighboring cells, instead of configuring/indicting the reference cell and neighboring cells to the UE in order to receive an RSTD measurement from the UE. The UE may use a specific PRS resource and/or a specific PRS resource index showing the best quality based on the measurement quality of the measured ToA as a reference for the RSTD measurement and reporting.

On the other hand, a two-step PRS transmission/reporting procedure may be considered based on the indication/configuration of the LMF/BS. In the first step, a rough UE location, a reference cell, a reference PRS resource, and/or a reference PRS resource set may be configured. In the first step, the UE may report to the BS/LMF a PRS resource, a PRS resource set, and/or a TP/BS/cell index with the best ToA/propagation delay time measurement quality. In the second step, the BS/LMF may transmit a PRS by allocating more resources such as power/time/frequency to the high-quality PRS resource based on the PRS resource information reported to the BS/LMF. In the second step, the UE may measure an RSTD based on the PRS transmitted by the BS and a reference TP/cell/PRS resources, which are configured by the BS or selected by the UE and report the RSTD to the BS/LMF.

The UE may request to allocate additional resources to a PRS transmitted from a specific TP/cell and/or on a specific transmission beam based on the quality of an acquired/measured ToA/ToF/OTDOTA measurement.

In addition, if the quality/reliability of a ToF/ToA measurement for a PRS transmitted from a reference cell and/or neighboring cell is significantly low, the UE may request/recommend the LMF/BS to change the reference cell and/or neighboring cell.

For example, if among N (>>1) PRSs received from TPs/cells, the quality of PRSs transmitted from K (<N) TPs/cells is good and the quality of the remaining PRSs is too low so that the remaining PRSs are not helpful for improving the positioning accuracy, the UE may request to allocate more power/time/frequency/space resources to the high-quality PRSs transmitted from the K TPs/cells. In addition, the UE may request the LMF/BS to change a low-quality neighboring TP/cell and/or serving TP/cell to another TP/cell.

Since the ToA measurement quality for a reference cell is the most important in calculating an RSTD value with a neighboring cell, the RSTD measurement quality for a plurality of neighboring cells is inevitably lowered if the ToA measurement quality of the reference cell is low. Therefore, in this case, if the reference cell is changed and more resources are allocated by the LMF to a PRS transmitted from a specific BS/TP, it is possible to increase the ToA measurement quality of the reference cell and increase the RSTD measurement quality.

To measure the location of the UE based on the OTDOA method, it is necessary to obtain ToA information from at least three or more cells/BSs/TPs and report an RSTD to the LMF based on the ToA information. If the RSRP/SNR of a PRS received from another cell/TP/BS other than the serving cell/TP/BS is too low or if there is a directivity problem between the PRS transmission beam direction of a neighboring cell and the reception beam of the UE, the UE may not perform the detection. In this case, the UE may determine that there occur significant errors if the BS/LMF measures the location of the UE based the OTDOA method or that it is impossible to apply the OTDOA method. Therefore, if the UE is configured to request/recommend the LMF/BS to use other UE positioning methods, it may be useful for UE positioning.

Accordingly, a method by which the UE requests the BS/LMF to change the positioning method will be described in Embodiment 2.

When the reliability and/or quality of a measurement obtained for a PRS resource and/or a PRS resource set configured by the BS/LMF is less than or equal to a specific threshold, the UE may recommend/request/report to the BS/LMF that UE positioning based on reporting contents currently configured/indicated to the UE is not suitable.

For example, when the UE reports to the BS/LMF a specific value and/or specific information which means that "UE positioning is not suitable", the BS/LMF may interpret the specific value and/or specific information to mean that even if the UE positioning is executed, the UE positioning has low reliability or significant positioning errors. For example, if the UE is instructed to report a ToA/RSTD value, if the quality of an RSTD or ToA measurement is less than or equal to a threshold, the UE may request/recommend/report to LMF/BS that the OTDOA-based UE positioning it is not suitable.

When the reliability and/or quality of a measurement for a PRS resource and/or a PRS resource set configured by the BS/LMF is less than or equal to a threshold, the UE may recommend/request/report to the BS/LMF to use another UE positioning method instead of a UE positioning method based on the currently configured/indicated reporting contents.

In addition, the UE may recommend/request/report to use another UE positioning method in addition to the UE positioning method that uses the reporting contents currently configured/indicated to the UE.

If different positioning methods are used together, the UE positioning accuracy may be improved. For example, when the UE is configured to report a ToA/RSTD value, if the quality of an RSTD and/or ToA measurement is below a threshold but the quality of an RSRP measurement measured with the same PRS is guaranteed to be above a certain level, the UE may request/recommend/report to the LMF/BS to use an AoD-based UE positioning method and/or a UE positioning method based on the signal strength of a reference signal in addition to the OTDOA method.

Here, the quality of an RSTD measurement may be replaced with the SNR/RSRP. However, considering that the RSTD is basically calculated based on a difference between ToA measurements for PRSs transmitted from a plurality of cells, if the ToA measurement reliability of a reference cell is high but the reliability of a ToA measurement measured for a PRS received from another cell/BS is quite low, the RSTD measurement quality may be low. Thus, even if the RSRP of the reference cell is sufficiently large, the RSTD quality may be significantly low.

Therefore, for example, even if the UE is configured to report a ToA/RSTD value, if the quality of a ToA/RSTD measurement is not sufficiently high, the UE may recommend/request to the BS to use a UE positioning method based on angles such as an AoD/AoA or a specific RAT-independent positioning method based on the GNSS or UE sensors together.

When the reliability and/or quality of a measurement obtained for a PRS resource and/or a PRS resource set configured by the BS/LMF is less than or equal to a specific threshold, the UE may report other measurement information more appropriate for UE positioning in addition to the currently configured/indicated reporting contents. The above-described UE operation may be indicated/configured by the BS/LMF to the UE.

For example, when the reliability and/or quality of a ToA/RSTD measurement obtained based on a PRS resource is less than or equal to a threshold or the error range of the ToA/RSTD measurement is too large, that is, more than or equal to a specific threshold, the UE may report the index of the PRS resource and/or the RSRP of the corresponding PRS resource to assist in obtaining the location of the UE based on the direction (e.g., angle) of a PRS transmission beam transmitted by the TP/BS and signal strength, instead of reporting the ToA/RSTD measurement. The above UE operation may be configured/instructed by the BS/LMF to the UE, or the UE may determine by itself and perform the above operation.

For example, when the UE determines that the OTDOA-based UE positioning is not suitable, the UE may request the BS/LMF to estimate the location of the UE based on a PRS beam direction, a PRS resource index related to the PRS beam direction, and/or an RSRP according to a single-cell or multi-cell based E-CID method. In this case, the BS/LMF may determine the location of the UE based on information on the direction and angle of a transmission beam transmitted from each TP/BS and RSRP information.

Meanwhile, the PRS resource index reported by the UE may be the index of one PRS resource among PRS resources included in a specific PRS resource set or the index of one specific PRS resource among PRS resources transmitted by one specific TP/BS. For example, when the UE reports a PRS resource with the maximum RSRP value among PRS resources transmitted by each TP/BS, the BS/LMF may obtain the AoD of a PRS transmission beam from each TP/BS to determine the location of the UE. The threshold mentioned in the present embodiment may be configured/indicated by the BS/LMF to the UE or defined by default.

In the above-described embodiment, the BS/LMF may more effectively determine/change the positioning method for estimating the location of the UE according to the recommendation/request from the UE. For example, if the BS/LMF intends to perform the OTDOA-based UE positioning, the UE may operate as follows.

When the UE determines that it is difficult to use the OTDOA method that requires three or more cells/TPs/BSs at a specific time or that another UE positioning method based on two or less cells/TPs/BS is more suitable than the OTDOA method, based on measurements obtained from PRSs, the UE may request/recommend/report to the BS/LMF/location server to estimate the location of the UE according to a specific RAT-dependent and/or RAT-independent UE positioning method based on a single cell/TP and/or two cells/TPs. For example, when the UE determines, based on PRS measurement results, that the OTDOA method is not suitable, the UE may request/report to introduce a single cell-based E-CID method. The above-described UE operation may be configured/instructed by the BS/LMF/location server.

The operation by which the UE determines that another UE positioning method based on two or less cells/TPs/BS is more suitable than the OTDOA method may be defined/configured in various ways. Specifically, the following examples may be defined/configured. In addition, the following UE operations may be configured/instructed by the BS/LMF.

(1) The UE may perform measurement on an RS such as a PRS, a CSI-RS and an SS/PBCH block transmitted from the BS/LMF. If it is difficult to guarantee minimum ToA/RSTD quality, that is, quality above a specific threshold for three or more ToAs/RSTDs based on the measurement result, the UE may determine that the OTDOA method is not suitable for UE positioning. The ToA/RSTD quality may be defined as the error range of an expected ToA/RSTD and/or a distance error range corresponding to the ToA/RSTD.

(2) The UE may define/configure a very large value such as a positive infinite value among ToA/RSTD report values. Then, by reporting the ToA/RSTD value, the UE may inform the LMF/BS that the ToA/RSTD value for a PRS is not valid. This reporting operation may be considered as signaling that the UE requests/recommends to the LMF/BS to use another UE positioning method other than (or besides) the OTDOA method. In other words, when the BS/LMF receives a very large ToA/RSTD value, the BS/LMF may consider/recognize that the UE requests/recommends use another method other than (or besides) the OTDOA method.

(3) The UE may define/configure a very small value such as a negative infinite value among ToA/RSTD quality report values. Then, by reporting the ToA/RSTD value, the UE may inform the LMF/BS that the ToA/RSTD for a PRS has very low quality and many errors. This reporting operation may be considered as signaling that the UE requests/recommends to the LMF/BS to use another UE positioning method other than (or besides) the OTDOA method. In other words, when the BS/LMF receives a very small ToA/RSTD value, the BS/LMF may consider/recognize that the UE requests/recommends use another method other than (or besides) the OTDOA method.

(4) The UE may perform measurement on an RS such as a PRS, a CSI-RS and an SS/PBCH block transmitted from the BS/LMF. If the UE is incapable of measuring or reporting ToA/RSTD values for three or more TPs/cells/BSs and/or RS resources and/or RS resource sets related thereto, the UE may determine that it is more suitable to use another positioning method than the OTDOA method.

As described above, a polarity of positioning methods may be simultaneously used to estimate the location of the UE instead of using only one positioning method, thereby further improving the UE positioning accuracy.

If the location of the UE is estimated by using a positioning method that uses angle information such as an AoD and information such as a ToA together rather than using only the OTDOA method in which the UE reports only an RSTD value for location estimation, the UE positioning accuracy may be further improved.

When a plurality of positioning methods are used to estimate the location of the UE, the UE needs to transmit report values for carrying AoD information together with an RSTD. For example, the UE may report the ID of a PRS resource and the RSRP value for the PRS resource to transmit the AoD information. In other words, if the UE includes all of the PRS resource ID, RSRP value, and RSTD value in parameters for reporting PRS-related measurements to the location server, it may be interpreted to mean that the UE requests more advanced positioning from the location server or the location server requests the UE to report a variety of information for the more advanced positioning.

Upon receiving the PRS resource ID, RSRP value for the corresponding PRS resource, and RSTD value reported by the UE, the location server may estimate the location of the UE by using all the information in combination.

The UE may additionally report the following examples in addition to the RSTD for the above-described complex location estimation (1) PRS resource index+RSRP Here, the PRS resource index may be related to a PRS resource with a maximum RSRP value. The PRS resource index may be used for UE positioning based on the AoD of a PRS beam.

(2) PRS resource index+ToA/RSTD

Here, the PRS resource index may be related to a PRS resource having a minimum ToA value.

If the method of measuring the location of the UE based on the AoD of a PRS transmission beam of a TP/BS and the OTDOA-based UE positioning method based on the ToA/RSTD are used together, the UE may be configured/instructed to report the PRS resource index independently for each method. For example, the LMF/BS may configure/instruct the UE to report the ToA/RSTD and the PRS resource index related to the ToA/RSTD and the RSRP and the PRS resource index related to the RSRP.

The configuration/instruction related to the PRS resource index reporting may vary depending on whether the location of the UE is measured based on the AoD of the PRS transmission beam of the TP/BS or the location of the UE is measured based on the ToA/RSTD. For example, when the LMF/BS configures/instructs the UE to report the ToA/RSTD and the PRS resource index, the LMF/BS may configure/instruct the UE to report the index of the PRS resource having the minimum ToA value among PRS resources transmitted from one TP/BS. In addition, when the LMF/BS configures/instructs the UE to report the RSRP and the PRS resource index, the LMF/BS may configure/instruct the UE to report the index of the PRS resource having the maximum RSRP value among PRS resources transmitted from one TP/BS. Meanwhile, even if there is no separate indication/configuration, the UE may automatically report the PRS resource index according to the reporting configuration for the RSRP or ToA/RSTD.

For example, the UE may determine whether the PRS resource index to be reported is related to the minimum ToA/RSTD or the maximum RSRP depending on whether PRS measurement is used for the OTDOA-based UE positioning or the AoD-based UE positioning. The above-described UE operation may be defined as default UE operation even though there is no separate instruction/configuration from the BS/LMF, or the UE may automatically configure/execute the UE operation.

For the OTDOA-based UE positioning, the BS/LMF may configure/instruct the UE to report the ToA/RSTD and/or the PRS resource index together with the ToA/RSTD to the BS/LMF. At the same time, the BS/LMF may configure/instruct the UE to report the RSRP and PRS resource index rather than the ToA/RSTD and PRS resource index if the quality of a ToA/RSTD measurement measured by the UE is less than or equal to a threshold. If the UE reports the ToA/RSTD and PRS resource index, the corresponding PRS resource index may be the index of the PRS resource having the minimum ToA/RSTD value. If the UE reports the RSRP and PRS resource index, the corresponding PRS resource index may be the index of the PRS resource having the maximum RSRP value. The above-described UE operation may be separately configured/instructed by the BS/LMF to the UE, or the UE may automatically perform the above-described operation. Alternatively, the UE operation may be defined by default.

Figure 23:
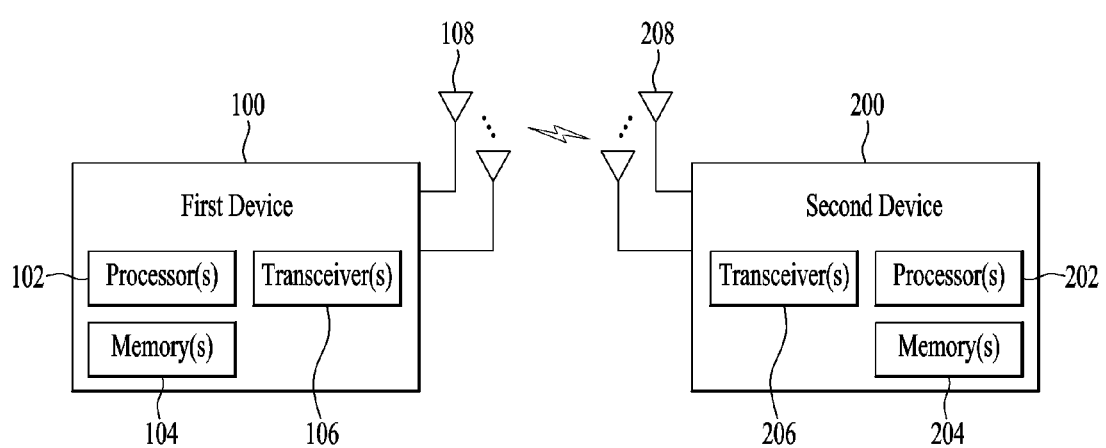
FIGS. 23 to 26 illustrate examples of various wireless devices to which embodiments of the present disclosure are applied.

FIG. 23 illustrates wireless devices applicable to the present disclosure.

Referring to FIG. 23, a first wireless device 100 and a second wireless device 200 may transmit radio signals through a variety of RATs (e.g., LTE and NR). Herein, {the first wireless device 100 and the second wireless device 200} may correspond to {the wireless device 100x and the BS 200} and/or {the wireless device 100x and the wireless device 100x} of FIG. 26.

The first wireless device 100 may include one or more processors 102 and one or more memories 104 and additionally further include one or more transceivers 106 and/or one or more antennas 108. The processor(s) 102 may control the memory(s) 104 and/or the transceiver(s) 106 and may be configured to implement the descriptions, functions, procedures, proposals, methods, and/or operational flowcharts disclosed in this document. For example, the processor(s) 102 may process information within the memory(s) 104 to generate first information/signals and then transmit radio signals including the first information/signals through the transceiver(s) 106. The processor(s) 102 may receive radio signals including second information/signals through the transceiver 106 and then store information obtained by processing the second information/signals in the memory(s) 104. The memory(s) 104 may be connected to the processor(s) 102 and may store a variety of information related to operations of the processor(s) 102. For example, the memory(s) 104 may store software code including commands for performing a part or the entirety of processes controlled by the processor(s) 102 or for performing the descriptions, functions, procedures, proposals, methods, and/or operational flowcharts disclosed in this document. Herein, the processor(s) 102 and the memory(s) 104 may be a part of a communication modem/circuit/chip designed to implement RAT (e.g., LTE or NR). The transceiver(s) 106 may be connected to the processor(s) 102 and transmit and/or receive radio signals through one or more antennas 108. Each of the transceiver(s) 106 may include a transmitter and/or a receiver. The transceiver(s) 106 may be interchangeably used with Radio Frequency (RF) unit(s). In the present disclosure, the wireless device may represent a communication modem/circuit/chip.

Specifically, commands and/or operations controlled by the processor(s) 102 and stored in the memory(s) 104 in the wireless device 100 according to an embodiment of the present disclosure will be described below.

While the operations are described in the context of control operations of the processor(s) 102 from the perspective of the processor(s) 102, software code for performing these operations may be stored in the memory(s) 104.

The processor(s) 102 may be configured to control the transceiver(s) 106 to receive a PRS configuration. The processor(s) 102 may be configured to control the transceiver(s) 106 to receive PRSs based on the PRS configuration. In addition, the processor(s) 102 may be configured to measure an RSRP and/or RSTD for each of a plurality of PRS resources included in the PRS configuration based on the received PRSs and control the transceiver(s) 106 to report information on the RSTD and a PRS resource index related to the RSTD and/or information on the RSRP and a PRS resource index related to the RSRP, based on the measurement. The processor(s) 102 may perform the above operations according to the above-described embodiments.

Hereinafter, description will be given of instructions and/or operations controlled by processor(s) 202 and stored in memory(s) 204 of the second wireless device 200 according to an embodiment of the present disclosure.

While the following operations are described in the context of control operations of the processor(s) 202 from the perspective of the processor(s) 202, software code for performing the operations may be stored in the memory(s) 204. The processor(s) 202 may be configured to control transceiver(s) 206 to transmit information including that an SS/PBCH block and/or a CSI-RS are used as a PRS resource or to determine a transmission/reception beam for transmitting and receiving the PRS resource to a location server 90 of FIG. 27.

The processor(s) 202 may be configured to control the transceiver(s) 206 to transmit a PRS configuration to the first wireless device 100. The processor(s) 202 may be configured to control the transceiver(s) 206 to transmit PRSs based on the PRS configuration. In addition, the processor(s) 202 may be configured to control the transceiver(s) 206 to receive information on RSTDs measured based on the PRSs and PRS resource indices related to the RSTDs and/or information on RSRPs and PRS resource indices related to the RSRPs. The processor(s) 202 may perform the above operations according to the above-described embodiments.

Hereinafter, hardware elements of the wireless devices 100 and 200 will be described more specifically. One or more protocol layers may be implemented by, without being limited to, one or more processors 102 and 202. For example, the one or more processors 102 and 202 may implement one or more layers (e.g., functional layers such as PHY, MAC, RLC, PDCP, RRC, and SDAP). The one or more processors 102 and 202 may generate one or more protocol data units (PDUs) and/or one or more service data units (SDUs) according to the descriptions, functions, procedures, proposals, methods, and/or operational flowcharts disclosed in this document. The one or more processors 102 and 202 may generate messages, control information, data, or information according to the descriptions, functions, procedures, proposals, methods, and/or operational flowcharts disclosed in this document. The one or more processors 102 and 202 may generate signals (e.g., baseband signals) including PDUs, SDUs, messages, control information, data, or information according to the descriptions, functions, procedures, proposals, methods, and/or operational flowcharts disclosed in this document and provide the generated signals to the one or more transceivers 106 and 206. The one or more processors 102 and 202 may receive the signals (e.g., baseband signals) from the one or more transceivers 106 and 206 and acquire the PDUs, SDUs, messages, control information, data, or information according to the descriptions, functions, procedures, proposals, methods, and/or operational flowcharts disclosed in this document.

The one or more processors 102 and 202 may be referred to as controllers, microcontrollers, microprocessors, or microcomputers. The one or more processors 102 and 202 may be implemented by hardware, firmware, software, or a combination thereof. As an example, one or more application specific integrated circuits (ASICs), one or more digital signal processors (DSPs), one or more digital signal processing devices (DSPDs), one or more programmable logic devices (PLDs), or one or more field programmable gate arrays (FPGAs) may be included in the one or more processors 102 and 202. The descriptions, functions, procedures, proposals, methods, and/or operational flowcharts disclosed in this document may be implemented using firmware or software and the firmware or software may be configured to include the modules, procedures, or functions. Firmware or software configured to perform the descriptions, functions, procedures, proposals, methods, and/or operational flowcharts disclosed in this document may be included in the one or more processors 102 and 202 or stored in the one or more memories 104 and 204 so as to be driven by the one or more processors 102 and 202. The descriptions, functions, procedures, proposals, methods, and/or operational flowcharts disclosed in this document may be implemented using firmware or software in the form of code, commands, and/or a set of commands.

The one or more memories 104 and 204 may be connected to the one or more processors 102 and 202 and store various types of data, signals, messages, information, programs, code, instructions, and/or commands. The one or more memories 104 and 204 may be configured by read-only memories (ROMs), random access memories (RAMs), electrically erasable programmable read-only memories (EPROMs), flash memories, hard drives, registers, cash memories, computer-readable storage media, and/or combinations thereof. The one or more memories 104 and 204 may be located at the interior and/or exterior of the one or more processors 102 and 202. The one or more memories 104 and 204 may be connected to the one or more processors 102 and 202 through various technologies such as wired or wireless connection.

The one or more transceivers 106 and 206 may transmit user data, control information, and/or radio signals/channels, mentioned in the methods and/or operational flowcharts of this document, to one or more other devices. The one or more transceivers 106 and 206 may receive user data, control information, and/or radio signals/channels, mentioned in the descriptions, functions, procedures, proposals, methods, and/or operational flowcharts disclosed in this document, from one or more other devices. For example, the one or more transceivers 106 and 206 may be connected to the one or more processors 102 and 202 and transmit and receive radio signals. For example, the one or more processors 102 and 202 may perform control so that the one or more transceivers 106 and 206 may transmit user data, control information, or radio signals to one or more other devices. The one or more processors 102 and 202 may perform control so that the one or more transceivers 106 and 206 may receive user data, control information, or radio signals from one or more other devices. The one or more transceivers 106 and 206 may be connected to the one or more antennas 108 and 208 and the one or more transceivers 106 and 206 may be configured to transmit and receive user data, control information, and/or radio signals/channels, mentioned in the descriptions, functions, procedures, proposals, methods, and/or operational flowcharts disclosed in this document, through the one or more antennas 108 and 208. In this document, the one or more antennas may be a plurality of physical antennas or a plurality of logical antennas (e.g., antenna ports). The one or more transceivers 106 and 206 may convert received radio signals/channels etc. from RF band signals into baseband signals in order to process received user data, control information, radio signals/channels, etc. using the one or more processors 102 and 202. The one or more transceivers 106 and 206 may convert the user data, control information, radio signals/channels, etc. processed using the one or more processors 102 and 202 from the base band signals into the RF band signals. To this end, the one or more transceivers 106 and 206 may include (analog) oscillators and/or filters.

In the present disclosure, the at least one memory 104 or 204 may store instructions or programs, and the instructions or programs may cause, when executed, at least one processor operably connected to the at least one memory to perform operations according to the above-described embodiments or implementations of the present disclosure.

In the present disclosure, a computer-readable storage medium may store at least one instruction or computer program, and the at least one instruction or computer program may cause, when executed by at least one processor, the at least one processor to perform operations according to the above-described embodiments or implementations of the present disclosure.

In the present disclosure, a processing device or apparatus may include at least one processor and at least one computer memory which is connectable to the at least one processor. The at least one computer memory may store instructions or programs, and the instructions or programs may cause, when executed, the at least one processor operably connected to the at least one memory to perform operations according to the above-described embodiments or implementations of the present disclosure.

Figure 24:
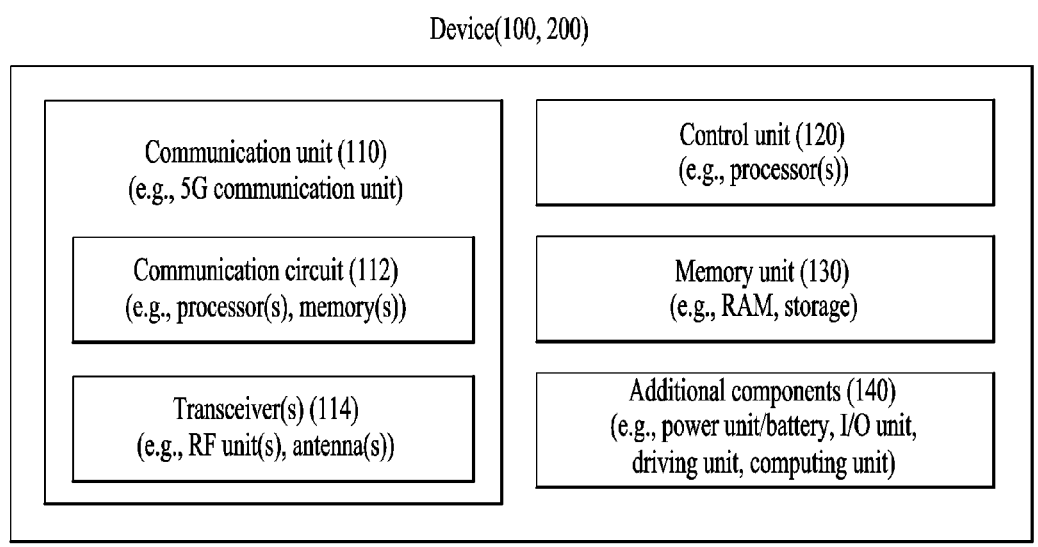

FIG. 24 illustrates another example of a wireless device applied to the present disclosure. The wireless device may be implemented in various forms according to a use-case/service (refer to FIG. 26)

Figure 27:
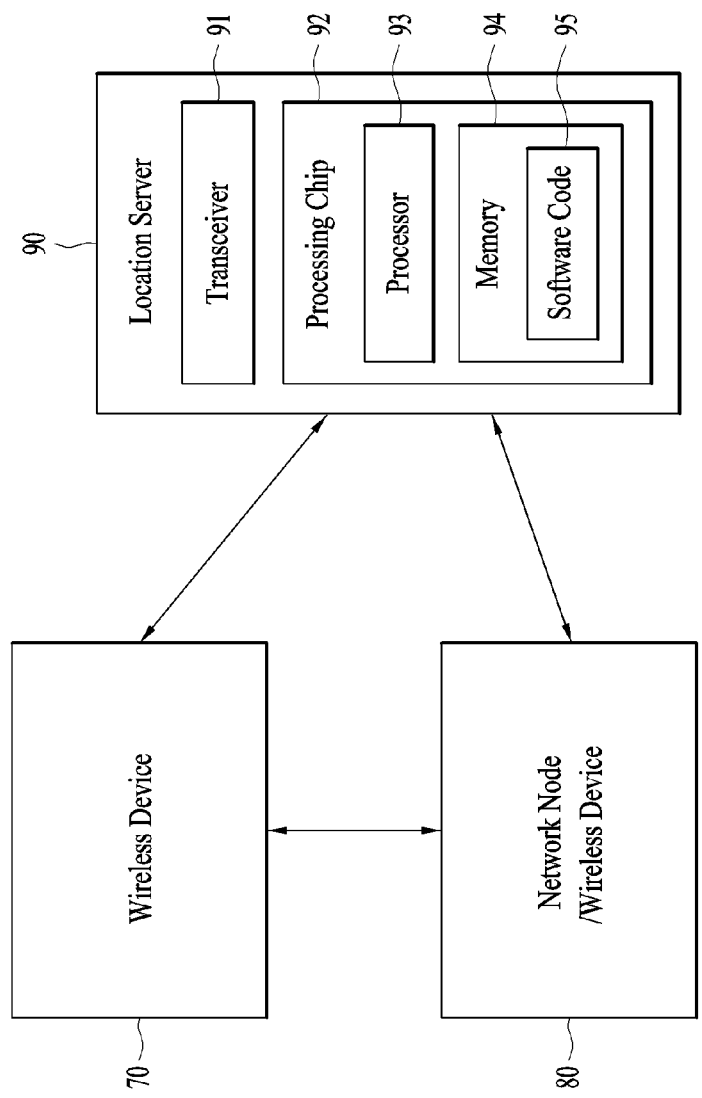
FIG. 27 illustrates an example of a location server to which embodiments of the present disclosure are applied.

Referring to FIG. 24, wireless devices 100 and 200 may correspond to the wireless devices 100 and 200 of FIG. 27 and may be configured by various elements, components, units/portions, and/or modules. For example, each of the wireless devices 100 and 200 may include a communication unit 110, a control unit 120, a memory unit 130, and additional components 140. The communication unit may include a communication circuit 112 and transceiver(s) 114. For example, the communication circuit 112 may include the one or more processors 102 and 202 and/or the one or more memories 104 and 204 of FIG. 27. For example, the transceiver(s) 114 may include the one or more transceivers 106 and 206 and/or the one or more antennas 108 and 208 of FIG. 27. The control unit 120 is electrically connected to the communication unit 110, the memory 130, and the additional components 140 and controls overall operation of the wireless devices. For example, the control unit 120 may control an electric/mechanical operation of the wireless device based on programs/code/commands/information stored in the memory unit 130. The control unit 120 may transmit the information stored in the memory unit 130 to the exterior (e.g., other communication devices) via the communication unit 110 through a wireless/wired interface or store, in the memory unit 130, information received through the wireless/wired interface from the exterior (e.g., other communication devices) via the communication unit 110. Accordingly, the detailed operating procedures of the control unit 120 and the programs/code/commands/information stored in the memory unit 130 may correspond to at least one operation of the processors 102 and 202 of FIG. 27 and at least one operation of the memories 104 and 204 of FIG. 27.

The additional components 140 may be variously configured according to types of wireless devices. For example, the additional components 140 may include at least one of a power unit/battery, input/output (I/O) unit, a driving unit, and a computing unit. The wireless device may be implemented in the form of, without being limited to, the robot (100*a* of FIG. 26), the vehicles (100*b*-1 and 100*b*-2 of FIG.

26), the XR device (100c of FIG. 26), the hand-held device (100d of FIG. 26), the home appliance (100e of FIG. 26), the IoT device (100f of FIG. 26), a digital broadcast terminal, a hologram device, a public safety device, an MTC device, a medicine device, a fintech device (or a finance device), a security device, a climate/environment device, the AI server/device (400 of FIG. 26), the BSs (200 of FIG. 26), a network node, etc. The wireless device may be used in a mobile or fixed place according to a use-example/service.

In FIG. 24, the entirety of the various elements, components, units/portions, and/or modules in the wireless devices 100 and 200 may be connected to each other through a wired interface or at least a part thereof may be wirelessly connected through the communication unit 110. For example, in each of the wireless devices 100 and 200, the control unit 120 and the communication unit 110 may be connected by wire and the control unit 120 and first units (e.g., 130 and 140) may be wirelessly connected through the communication unit 110. Each element, component, unit/portion, and/or module within the wireless devices 100 and 200 may further include one or more elements. For example, the control unit 120 may be configured by a set of one or more processors. As an example, the control unit 120 may be configured by a set of a communication control processor, an application processor, an Electronic Control Unit (ECU), a graphical processing unit, and a memory control processor. As another example, the memory 130 may be configured by a Random Access Memory (RAM), a Dynamic RAM (DRAM), a Read Only Memory (ROM)), a flash memory, a volatile memory, a non-volatile memory, and/or a combination thereof.

Hereinafter, the embodiment of FIG. 24 will be described in detail with reference to the drawings.

Figure 25:
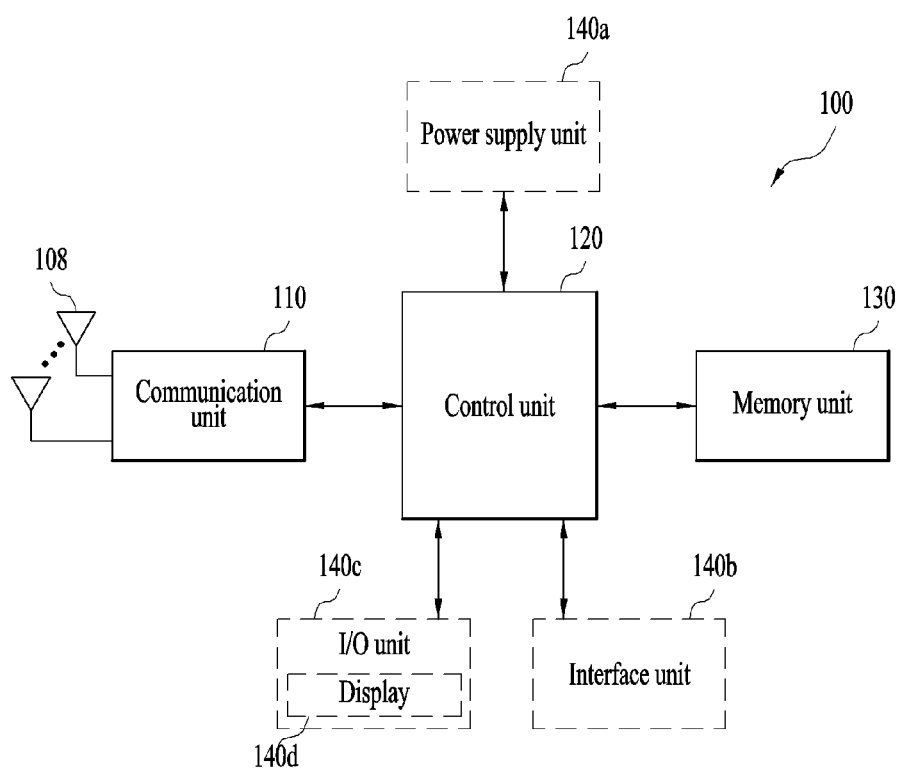

FIG. 25 illustrates an exemplary portable device to which various embodiments of the present disclosure are applied. The portable device may be any of a smartphone, a smartpad, a wearable device (e.g., a smartwatch or smart glasses), and a portable computer (e.g., a laptop). A portable device may also be referred to as mobile station (MS), user terminal (UT), mobile subscriber station (MSS), subscriber station (SS), advanced mobile station (AMS), or wireless terminal (WT).

Referring to FIG. 25, a hand-held device 100 may include an antenna unit 108, a communication unit 110, a control unit 120, a memory unit 130, a power supply unit 140a, an interface unit 140b, and an I/O unit 140c. The antenna unit 108 may be configured as a part of the communication unit 110. Blocks 110 to 130/140a to 140c correspond to the blocks 110 to 130/140 of FIG. 23, respectively.

The communication unit 110 may transmit and receive signals (e.g., data and control signals) to and from other wireless devices or BSs. The control unit 120 may perform various operations by controlling constituent elements of the hand-held device 100. The control unit 120 may include an Application Processor (AP). The memory unit 130 may store data/parameters/programs/code/commands needed to drive the hand-held device 100. The memory unit 130 may store input/output data/information. The power supply unit 140a may supply power to the hand-held device 100 and include a wired/wireless charging circuit, a battery, etc. The interface unit 140b may support connection of the hand-held device 100 to other external devices. The interface unit 140b may include various ports (e.g., an audio I/O port and a video I/O port) for connection with external devices. The I/O unit 140c may input or output video information/signals, audio information/signals, data, and/or information input by a user. The I/O unit 140c may include a camera, a microphone, a user input unit, a display unit 140d, a speaker, and/or a haptic module.

As an example, in the case of data communication, the I/O unit 140c may acquire information/signals (e.g., touch, text, voice, images, or video) input by a user and the acquired information/signals may be stored in the memory unit 130. The communication unit 110 may convert the information/signals stored in the memory into radio signals and transmit the converted radio signals to other wireless devices directly or to a BS. The communication unit 110 may receive radio signals from other wireless devices or the BS and then restore the received radio signals into original information/signals. The restored information/signals may be stored in the memory unit 130 and may be output as various types (e.g., text, voice, images, video, or haptic) through the I/O unit 140c.

Figure 26:
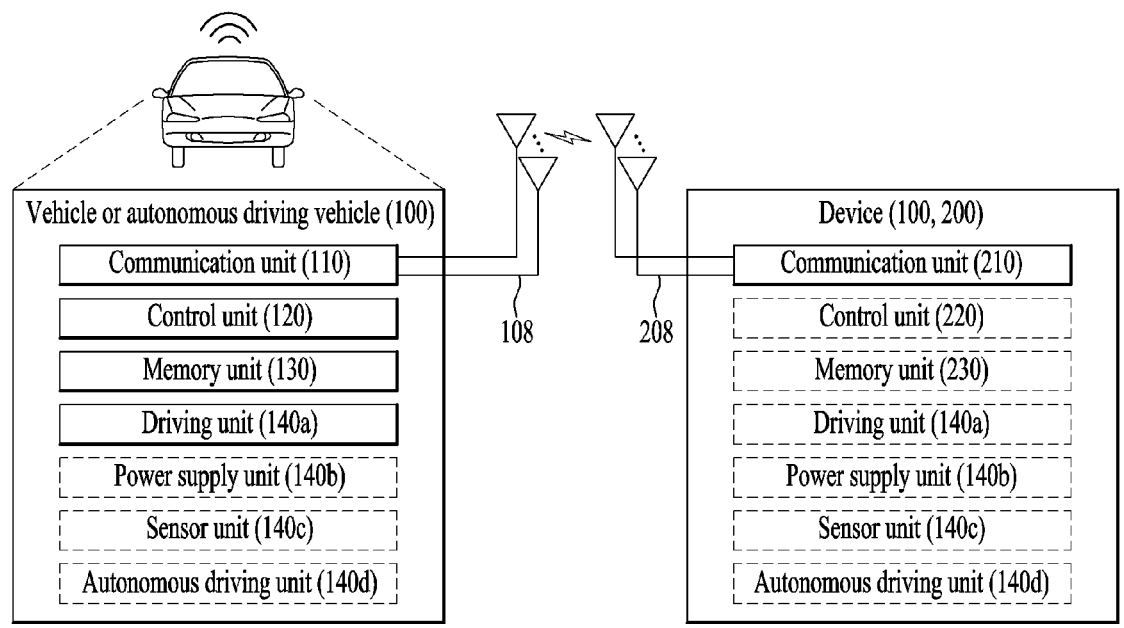

FIG. 26 illustrates a vehicle or an autonomous driving vehicle applied to the present disclosure. The vehicle or autonomous driving vehicle may be implemented by a mobile robot, a car, a train, a manned/unmanned Aerial Vehicle (AV), a ship, etc.

Referring to FIG. 26, a vehicle or autonomous driving vehicle 100 may include an antenna unit 108, a communication unit 110, a control unit 120, a driving unit 140a, a power supply unit 140b, a sensor unit 140c, and an autonomous driving unit 140d. The antenna unit 108 may be configured as a part of the communication unit 110. The blocks 110/130/140a to 140d correspond to the blocks 110/130/140 of FIG. 30, respectively.

The communication unit 110 may transmit and receive signals (e.g., data and control signals) to and from external devices such as other vehicles, BSs (e.g., gNBs and road side units), and servers. The control unit 120 may perform various operations by controlling elements of the vehicle or the autonomous driving vehicle 100. The control unit 120 may include an Electronic Control Unit (ECU). The driving unit 140a may cause the vehicle or the autonomous driving vehicle 100 to drive on a road. The driving unit 140a may include an engine, a motor, a powertrain, a wheel, a brake, a steering device, etc. The power supply unit 140b may supply power to the vehicle or the autonomous driving vehicle 100 and include a wired/wireless charging circuit, a battery, etc. The sensor unit 140c may acquire a vehicle state, ambient environment information, user information, etc. The sensor unit 140c may include an Inertial Measurement Unit (IMU) sensor, a collision sensor, a wheel sensor, a speed sensor, a slope sensor, a weight sensor, a heading sensor, a position module, a vehicle forward/backward sensor, a battery sensor, a fuel sensor, a tire sensor, a steering sensor, a temperature sensor, a humidity sensor, an ultrasonic sensor, an illumination sensor, a pedal position sensor, etc. The autonomous driving unit 140d may implement technology for maintaining a lane on which a vehicle is driving, technology for automatically adjusting speed, such as adaptive cruise control, technology for autonomously driving along a determined path, technology for driving by automatically setting a path if a destination is set, and the like.

For example, the communication unit 110 may receive map data, traffic information data, etc. from an external server. The autonomous driving unit 140d may generate an autonomous driving path and a driving plan from the obtained data. The control unit 120 may control the driving unit 140a such that the vehicle or the autonomous driving vehicle 100 may move along the autonomous driving path according to the driving plan (e.g., speed/direction control).

In the middle of autonomous driving, the communication unit 110 may aperiodically/periodically acquire recent traffic information data from the external server and acquire surrounding traffic information data from neighboring vehicles. In the middle of autonomous driving, the sensor unit 140c may obtain a vehicle state and/or surrounding environment information. The autonomous driving unit 140d may update the autonomous driving path and the driving plan based on the newly obtained data/information. The communication unit 110 may transfer information about a vehicle position, the autonomous driving path, and/or the driving plan to the external server. The external server may predict traffic information data using AI technology, etc., based on the information collected from vehicles or autonomous driving vehicles and provide the predicted traffic information data to the vehicles or the autonomous driving vehicles.

To perform the embodiments of the present disclosure, there may be provided the location server 90 as illustrated in FIG. 27. The location server 90 may be logically or physically connected to a wireless device 70 and/or a network node 80. The wireless device 70 may be the first wireless device 100 of FIG. 27 and/or the wireless device 100 or 200 of FIG. 28. The network node 80 may be the second wireless device 100 of FIG. 27 and/or the wireless device 100 or 200 of FIG. 28.

The location server 90 may be, without being limited to, an AMF, an LMF, an E-SMLC, and/or an SLP and may be any device only if the device serves as the location server 90 for implementing the embodiments of the present disclosure. Although the location server 90 has used the name of the location server for convenience of description, the location server 90 may be implemented not as a server type but as a chip type. Such a chip type may be implemented to perform all functions of the location server 90 which will be described below.

Specifically, the location server 90 includes a transceiver 91 for communicating with one or more other wireless devices, network nodes, and/or other elements of a network. The transceiver 91 may include one or more communication interfaces. The transceiver 91 communicates with one or more other wireless devices, network nodes, and/or other elements of the network connected through the communication interfaces.

The location server 90 includes a processing chip 92. The processing chip 92 may include at least one processor, such as a processor 93, and at least one memory device, such as a memory 94.

The processing chip 92 may control one or more processes to implement the methods described in this specification and/or embodiments for problems to be solved by this specification and solutions for the problems. In other words, the processing chip 92 may be configured to perform at least one of the embodiments described in this specification. That is, the processor 93 includes at least one processor for performing the function of the location server 90 described in this specification. For example, one or more processors may control the one or more transceivers 91 of FIG. 32 to transmit and receive information.

The processing chip 92 includes a memory 94 configured to store data, programmable software code, and/or other information for performing the embodiments described in this specification.

In other words, according to an embodiment of the present disclosure, the memory 95 may be configured to store software code 95 including instructions that, when executed by at least one processor such as the processor 93, cause the processor 93 to perform some or all of the processes controlled by the processor 93 of FIG. 27 or the embodiments of the present disclosure Hereinafter, description will be given of instructions and/or operations controlled by the processor 93 of the location server 90 and stored in the memory 94 according to an embodiment of the present disclosure.

While the following operations will be described in the context of control operations of the processor 93 from the perspective of the processor 93, software code for performing the operations may be stored in the memory 94. The processor 93 may be configured to control the transceiver 91 to transmit a PRS configuration to the second wireless device 200 of FIG. 23 and/or the first wireless device 100 of FIG. 23. In addition, the processor 93 may be configured to control the transceiver 91 to receive information on RSTDs measured based on the PRS configuration and PRS resource indices related to the RSTDs and/or information on RSRPs and PRS resource indices related to the RSRPs. The processor 93 may be configured to determine the location of a UE based on the information on the RSTDs and PRS resource indices related to the RSTDs and/or the information on the RSRPs and PRS resource indices related to the RSRPs. The processor 93 may perform the above operations according to the above-described embodiments.

Figure 28:
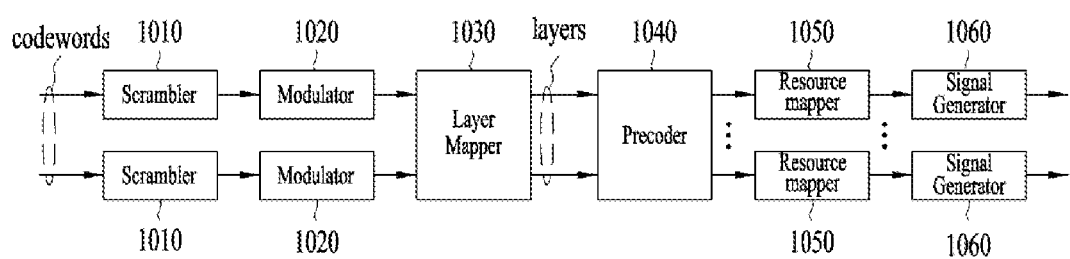
FIG. 28 illustrates an example of a signal processing circuit to which embodiments of the present disclosure are applied.

FIG. 28 illustrates a signal process circuit for a transmission signal.

Referring to FIG. 28, a signal processing circuit 1000 may include scramblers 1010, modulators 1020, a layer mapper 1030, a precoder 1040, resource mappers 1050, and signal generators 1060. An operation/function of FIG. 31 may be performed, without being limited to, the processors 102 and 202 and/or the transceivers 106 and 206 of FIG. 27. Hardware elements of FIG. 31 may be implemented by the processors 102 and 202 and/or the transceivers 106 and 206 of FIG. 27. For example, blocks 1010 to 1060 may be implemented by the processors 102 and 202 of FIG. 27. Alternatively, the blocks 1010 to 1050 may be implemented by the processors 102 and 202 of FIG. 27 and the block 1060 may be implemented by the transceivers 106 and 206 of FIG. 27.

Codewords may be converted into radio signals via the signal processing circuit 1000 of FIG. 31. Herein, the codewords are encoded bit sequences of information blocks. The information blocks may include transport blocks (e.g., a UL-SCH transport block, a DL-SCH transport block). The radio signals may be transmitted through various physical channels (e.g., a PUSCH and a PDSCH).

Specifically, the codewords may be converted into scrambled bit sequences by the scramblers 1010. Scramble sequences used for scrambling may be generated based on an initialization value, and the initialization value may include ID information of a wireless device. The scrambled bit sequences may be modulated to modulation symbol sequences by the modulators 1020. A modulation scheme may include pi/2-Binary Phase Shift Keying (pi/2-BPSK), m-Phase Shift Keying (m-PSK), and m-Quadrature Amplitude Modulation (m-QAM). Complex modulation symbol sequences may be mapped to one or more transport layers by the layer mapper 1030. Modulation symbols of each transport layer may be mapped (precoded) to corresponding antenna port(s) by the precoder 1040. Outputs z of the precoder 1040 may be obtained by multiplying outputs y of the layer mapper 1030 by an N*M precoding matrix W. Herein, N is the number of antenna ports and M is the number of transport layers. The precoder 1040 may perform precoding after performing transform precoding (e.g., DFT)

for complex modulation symbols. Alternatively, the precoder 1040 may perform precoding without performing transform precoding.

The resource mappers 1050 may map modulation symbols of each antenna port to time-frequency resources. The time-frequency resources may include a plurality of symbols (e.g., a CP-OFDMA symbols and DFT-s-OFDMA symbols) in the time domain and a plurality of subcarriers in the frequency domain. The signal generators 1060 may generate radio signals from the mapped modulation symbols and the generated radio signals may be transmitted to other devices through each antenna. For this purpose, the signal generators 1060 may include Inverse Fast Fourier Transform (IFFT) modules, Cyclic Prefix (CP) inserters, Digital-to-Analog Converters (DACs), and frequency up-converters.

Signal processing procedures for a signal received in the wireless device may be configured in a reverse manner of the signal processing procedures 1010 to 1060 of FIG. 31. For example, the wireless devices (e.g., 100 and 200 of FIG. 28) may receive radio signals from the exterior through the antenna ports/transceivers. The received radio signals may be converted into baseband signals through signal restorers. To this end, the signal restorers may include frequency downlink converters, Analog-to-Digital Converters (ADCs), CP remover, and Fast Fourier Transform (FFT) modules. Next, the baseband signals may be restored to codewords through a resource demapping procedure, a postcoding procedure, a demodulation processor, and a descrambling procedure. The codewords may be restored to original information blocks through decoding. Therefore, a signal processing circuit (not illustrated) for a reception signal may include signal restorers, resource demappers, a postcoder, demodulators, descramblers, and decoders.

The implementations described above are those in which the elements and features of the present disclosure are combined in a predetermined form. Each component or feature shall be considered optional unless otherwise expressly stated. Each component or feature may be implemented in a form that is not combined with other components or features. It is also possible to construct implementations of the present disclosure by combining some of the elements and/or features. The order of the operations described in the implementations of the present disclosure may be changed. Some configurations or features of certain implementations may be included in other implementations, or may be replaced with corresponding configurations or features of other implementations. It is clear that the claims that are not expressly cited in the claims may be combined to form an implementation or be included in a new claim by an amendment after the application.

The specific operation described herein as being performed by the base station may be performed by its upper node, in some cases. That is, it is apparent that various operations performed for communication with a terminal in a network including a plurality of network nodes including a base station can be performed by the base station or by a network node other than the base station. A base station may be replaced by terms such as a fixed station, a Node B, an eNode B (eNB), an access point, and the like.

It will be apparent to those skilled in the art that the present disclosure may be embodied in other specific forms without departing from the spirit of the disclosure. Accordingly, the above description should not be construed in a limiting sense in all respects and should be considered illustrative. The scope of the present disclosure should be determined by rational interpretation of the appended claims, and all changes within the scope of equivalents of the present disclosure are included in the scope of the present disclosure.

While the present disclosure has been described in the context of a 5G New RAT system, the method and apparatus are also applicable to various other wireless communication systems.

What is claimed is:

1. A method of performing a reference signal time difference (RSTD) measurement based on positioning reference signals (PRSs) by a user equipment (UE) in a wireless communication system, the method comprising:
   receiving information related to a plurality of PRS resources;
   performing at least one RSTD measurement based on the information related to the plurality of PRS resources; and
   transmitting a report based on the at least one RSTD measurement,
   wherein the information related to the plurality of PRS resources includes first reference information regarding a reference transmission point (TP) for the at least one RSTD measurement,
   wherein, based on a first PRS resource being determined by the UE as a reference PRS resource for the at least one RSTD measurement after the first reference information is configured, the report is configured to include second reference information regarding the first PRS resource determined by the UE, and
   wherein the plurality of PRS resources are associated with a plurality of beams of a TP.

2. The method of claim 1,
   wherein the at least one RSTD measurement is related to an observed time difference of arrival (OTDOA).

3. The method of claim 1,
   wherein the report includes:
      information regarding at least one reference signal received power (RSRP) based on at least on second PRS resource among the plurality of PRS resources, and
      at least one second PRS index related to the at least one second PRS resource.

4. The method of claim 3,
   wherein, based on quality of the at least one RSTD measurement being less than or equal to a predetermined threshold, the report includes the information regarding the at least one RSRP and the at least one second PRS resource.

5. A user equipment (UE) configured to operate in in a wireless communication system, the UE comprising:
   a transceiver; and
   at least one processor coupled with the transceiver,
   wherein the at least one processor is configured to:
      receive information related to a plurality of positioning reference signals (PRS) resources;
      perform at least one reference signal time difference (RSTD) measurement based on the information related to the plurality of PRS resources;
      transmit a report based on the at least one RSTD measurement;
   wherein the information related to the plurality of PRS resources includes first reference information regarding the reference transmission point (TP) for the at least one RSTD measurement,
   wherein, based on the first PRS resource being determined by the UE as a reference PRS resource for the at least one RSTD measurement after the first reference information is configured, the report is configured to include second reference information regarding the first PRS resource determined by the UE, and wherein the plurality of PRS resources are associated with a plurality of beams of a TP.

6. A method performed by a network node in a wireless communication system, the method comprising:

transmitting, to a user equipment (UE), information related to a plurality of positioning reference signal (PRS) resources; and receiving a report regarding at least one reference signal time difference (RSTD) measurement based on the information related to the plurality of PRS resource, wherein the information related to the plurality of PRS resources includes first reference information regarding a reference transmission point (TP) for the at least one RSTD measurement, wherein, based on the report including second reference information regarding a first PRS resource, the network node is configured to determine that the first PRS resource has been determined by the UE as a reference PRS resource for the at least one RSTD measurement after the first reference information is configured, and wherein the plurality of PRS resources are associated with a plurality of beams of a TP.

7. A network node configured to operate in a wireless communication system, the network node comprising:

a transceiver; and at least one processor configured to control the transceiver, wherein the at least one processor is configured to:
    transmit, to a user equipment (UE), information related to a plurality of positioning reference signal (PRS) resources;
    receive a report regarding at least one reference signal time difference (RSTD) measurement based on the information related to the plurality of PRS resources, wherein the information related to the plurality of PRS resources includes first reference information regarding a reference transmission point (TP) for the at least one RSTD measurement, wherein, based on the report including second reference information regarding a first PRS resource, the at least one processor is configured to determine that the first PRS resource has been determined by the UE as a reference PRS resource for the at least one RSTD measurement after the first reference information is configured, and wherein the plurality of PRS resources are associated with a plurality of beams of a TP.

* * * * *